(12) United States Patent
Masuda et al.

(10) Patent No.: US 10,635,507 B2
(45) Date of Patent: Apr. 28, 2020

(54) EVENT MONITORING APPARATUS AND EVENT MONITORING METHOD

(71) Applicant: Hitachi, Ltd., Chiyoda-ku, Tokyo (JP)

(72) Inventors: Mineyoshi Masuda, Tokyo (JP); Hideto Kurose, Tokyo (JP); Keita Azuma, Tokyo (JP); Mitsuhiro Nagata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/291,312

(22) Filed: Mar. 4, 2019

(65) Prior Publication Data
US 2020/0012543 A1 Jan. 9, 2020

(30) Foreign Application Priority Data

Jul. 9, 2018 (JP) ................................ 2018-129722

(51) Int. Cl.
*G06F 9/54* (2006.01)
*G06F 11/07* (2006.01)
*G06N 20/00* (2019.01)

(52) U.S. Cl.
CPC ............ *G06F 9/542* (2013.01); *G06F 11/079* (2013.01); *G06F 11/0793* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2007/0220365 A1* | 9/2007 | Castellani | G06Q 10/00 714/46 |
| 2014/0324865 A1 | 10/2014 | Mizutani | |
| 2015/0039625 A1* | 2/2015 | Nisbet | G06F 9/542 707/746 |
| 2017/0161772 A1* | 6/2017 | Xu | G06N 20/10 |

* cited by examiner

*Primary Examiner* — Craig C Dorais
(74) *Attorney, Agent, or Firm* — Crowell & Moring LLP

(57) ABSTRACT

A technique for improving determination of handling of guides to events generated in an information system is provided. An event monitoring apparatus for monitoring an event including an event message indicated by a character string related to a phenomenon occurring in an information system includes a guide storage unit that stores a plurality of guides including guide messages indicated by a character string and indicating a method of handling the event and a threshold relating to similarity between the guide messages of the guides and event messages in association with each other; an event storage unit that records the event from the information system; and a guide provision unit that calculates the similarity between the event messages included in the event and the guide messages of the guide and associates a guide whose similarity exceeds a threshold with the event.

13 Claims, 16 Drawing Sheets

FIG. 3

| EVENT ID | OCCURRENCE TIME | EVENT MESSAGE | OCCURRENCE SOURCE | AGENT TYPE |
|---|---|---|---|---|
| E1 | 2018/4/1 00:00:00 | ERROR OCCURS IN DEVICE S1. | HOST 1 | OS |
| E2 | 2018/4/1 00:10:05 | ABNORMALITY IS TERMINATED IN BATCH JOB J1. | HOST 2 | MIDDLE |
| E3 | 2018/4/2 08:30:00 | ERROR OCCURS IN DEVICE S2. | HOST 1 | OS |
| E4 | 2018/4/2 17:00:00 | ERROR OCCURS IN BUSINESS A | HOST 3 | USER |
| ⋮ | ⋮ | ⋮ | ⋮ | ⋮ |

FIG. 4

| GUIDE ID 301 | GUIDE MESSAGE 302 | REPORT DESTINATION 303 | DETERMI-NATION RULE 304 | THRESHOLD 305 | LEARNING COMPLETION FLAG 306 | REQUIRED KEYWORDE 307 | AGENT TYPE 308 |
|---|---|---|---|---|---|---|---|
| G1 | DEVICE S1 | TEAM A | IF…THEN | 0.8 | Y | NONE | OS |
| G2 | DEVICE S2 | TEAM B | IF…THEN | n/a | N | NONE | OS |
| G3 | NW DEVICE S5…NETWOEK DEVICE… | TEAM C | IF…THEN | 0.6 | Y | S5 | OS |
| G4 | BATCH JOB J1… | TEAM B | IF…THEN | 0.7 | Y | NONE | OS |
| ⋮ | ⋮ | ⋮ | ⋮ | 0.5 | Y | J1 | MIDDLE |
| | | | | ⋮ | ⋮ | ⋮ | ⋮ |

| EVENT ID | GUIDE ID | SIMILARITY SCORE | PROVISION NECESSITY | REPORT NECESSITY | FEEDBACK |
|---|---|---|---|---|---|
| E1 | G1 | 0.9 | NECESSARY | Y | CORRECT |
|  | G3 | 0.7 | NECESSARY | N | INCORRECT |
| E2 | G4 | 0.55 | NECESSARY | Y | PENDING |
|  | G99 | 0.4 | UNNECESSARY | N | PENDING |
| ⋮ | ⋮ | ⋮ | ⋮ | ⋮ | ⋮ |

FIG. 14

| ATTRIBUTE | CONDITION VALUE |
|---|---|
| AGENT TYPE | OS |
| | MIDDLE |
| ⋮ | ⋮ |

EVENT MONITORING APPARATUS AND EVENT MONITORING METHOD

BACKGROUND

The present invention relates to a technique for supporting a work of monitoring events occurring in an information system.

One of the operational tasks of the information system (IT (Information Technology) system) is to monitor events. In critical IT systems leveraged in core business or the like in companies, when a phenomenon such as malfunction or abnormality occurs, an event is issued.

Event is data issued by a program called an agent which is mounted to the IT system. The agent is intended for observing elements configuring the IT system, for example, hardware or software such as OS (operating system) and middleware, observes a performance of an object to be monitored and a state such as lift and death, and acquires log data output from the object to be monitored. When the observed state or the acquired log data corresponds to a specific condition, the agent issues an event indicating occurrence of a phenomenon corresponding to the specific condition. Since the event is data for transmitting the occurring event to a person, the event usually includes character string data representing a place where the event has occurred, the object to be monitored where the event has occurred, and the occurred phenomenon to be read and understandable by a person. This character string data is called an event message. The event issued by the agent is sent to a management computer.

The management computer stores events received from each agent, and centrally manages the stored events. In the management computer, a monitoring operator (human) monitors events received from each agent. The monitoring operator checks the received events one by one, and if the monitoring operator discovers the events that lead to serious disorders, the monitoring operator reports the events to a host manager. That the monitoring operator reports the event to the host manager is referred to as an escalation. The monitoring operator determines whether or not escalation is necessary according to an event handling guide.

A guide indicating how to handle the event is described in the event handling guide for each event. Each guide includes a guide message which is a sample of an event message of the event to be handled and a criterion for determining whether or not the event is escalated.

As a task to be performed by the monitoring operator, when a new event arrives in the management computer, the monitoring operator first searches for a guide that matches the event from the event handing guide. Specifically, the monitoring operator finds out a guide having a guide message close to the content of an event message included in the event with the use of visual inspection of a document, search of the document, or the like. Further, the monitoring operator determines the necessity of escalation according to the determination criteria included in the found guide and performs the escalation as needed.

The event monitoring work includes a series of operations related to the monitoring of the event described above. The event monitoring work is appropriately continued, thereby being capable of discovering a failure of the IT system at an early stage, and appropriately handling the failure. In other words, the monitoring operator needs to always perform the event monitoring work as long as the IT system is operated. For that reason, labor costs of the event monitoring work become very large.

In particular, it is significant costly for the monitoring operator to perform the work of finding out the guide handling the event. If an IT system to be monitored is large-scale, or the number of IT systems to be monitored is larger, the number of guides included in the event handling guide may range from thousands to several tens of thousands, and it may take long time for the work of searching the guide handling the event. An increase in working time not only increases the cost but also becomes a factor of delaying a response to the failure.

For that reason, a technology to support the event monitoring work on the computer has been proposed. US 2014/0324865A1 discloses a technique of comparing an event message with a guide message as a character string and automatically identifying a guide message similar to the event message. The technique of US 2014/0324865A1 compares the character strings of each row output to a log with each other and calculate the proximity of the rows.

SUMMARY

With the use of the technique of US 2014/0324865A1, the guide message similar to the event message can be automatically identified. This may assist the monitoring operator in finding a guide to the event.

Nevertheless, an event that does not correspond to any guide may be included in the events output from the IT system. On the other hand, the event corresponding to multiple guides may be included. The technique of US 2014/0324865A1 identifies the guide message similar to the event message, problems may arise in which a guide is presented in association with the event corresponding to none of the guides, and only one guide is presented for the event corresponding to multiple guides.

An object of the present invention is to provide a technique for improving determination of associating guides with events generated in an information system.

According to one aspect of the present invention, there is provided an event monitoring apparatus for monitoring an event including an event message indicated by a character string related to a phenomenon occurring in an information system, the event monitoring apparatus including: a guide storage unit that stores a plurality of guides including guide messages indicated by a character string and indicating a method of handling the event and a threshold relating to similarity between the guide messages of the guides and event messages in association with each other; an event storage unit that records the event from the information system; and a guide provision unit that calculates the similarity between the event messages included in the event and the guide messages of the guide and associates a guide whose similarity exceeds a threshold with the event.

Since the threshold of the similarity is provided for each guide, and guide is provided to the event whose similarity with the guide exceeds the threshold, it can be appropriately determined whether or not the guide is provided to the event for each guide.

BRIEF DESCRIPTION OF THE DRAWINGS

FIG. 3 is a diagram showing a configuration example of an event table 200;

FIG. 4 is a diagram showing a configuration example of a guide table 300;

FIG. 5 is a diagram showing a configuration example of a guide provision result table 400;

FIG. 14 is a diagram showing a configuration example of a remote registration condition table 1300;

DETAILED DESCRIPTION

Embodiments of the present invention will be described.

Figure 1:
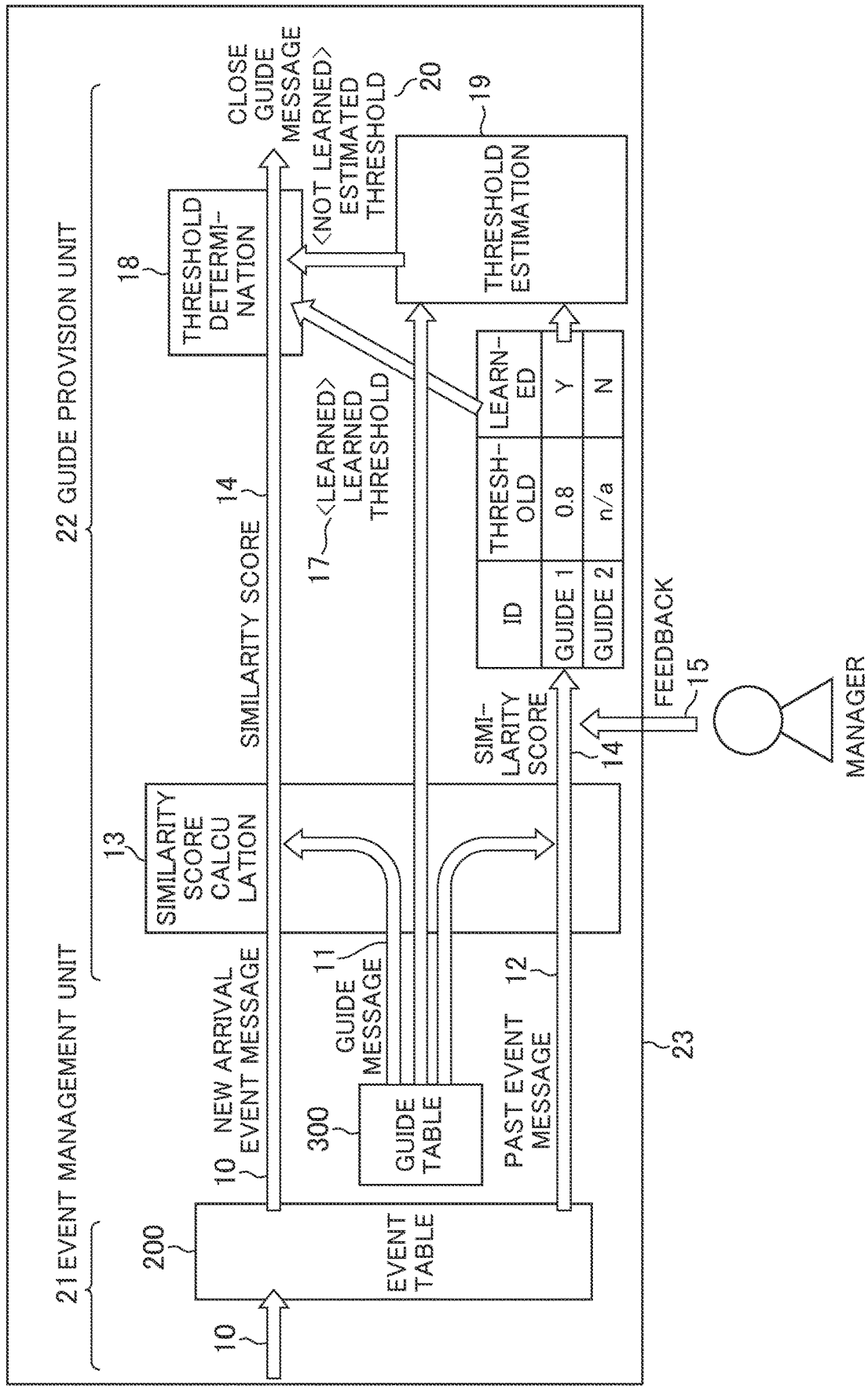
FIG. 1 is a diagram illustrating an overview of an event monitoring system according to the present embodiment.

FIG. 1 is a diagram illustrating an outline of an event monitoring system according to the present embodiment. An event monitoring system 23 has an event management unit 21, a guide provision unit 22, an event table 200, and a guide table 300 as a schematic configuration. The event monitoring system 23 is a computer system for monitoring an event including an event message indicated by a character string related to a phenomenon generated in an IT system (not shown). The event is issued in the IT system, and the event monitoring system 23 receives and processes the event.

The event monitoring system 23 stores in advance various guides showing a method of handling various events in the guide table 300. The guide includes a guide message describing how to handle the event in a character string. In addition, the guide table 300 can record a threshold related to a similarity between a guide message of the guide and an event message in association with each guide. The degree of similarity between the guide message and the event message is also referred to as a similarity score and is an index indicating the degree of similarity between the guide message and the event message, and the higher the value, the higher the degree of similarity.

When the event is issued from the IT system, the event monitoring system 23 records the event in the event table 200, and the guide provision unit 22 calculates the similarity between the event message 10 indicated by the character string included in the event and the guide message 11 of each guide stored in the guide table 300, and determines that a method of handling the event is indicated by the guide if the similarity exceeds the threshold, and associates the even with the guide.

In the present embodiment, with the above configuration, whether or not the guide is provided to the event can be appropriately determined for each guide.

In the following description, when the method for handling the event is shown by the guide, it may be expressed that the guide corresponds to the event. Also, that a guide corresponding to an event is found out and associated with the event may express that the guide is provided to the event.

The setting of the threshold by the event monitoring system 23 according to the present embodiment and an overview of the guide provision process using the threshold will be described.

In the event monitoring system 23, the event management unit 21 stores the event issued in the past in the IT system in the event table 200. The event monitoring system 23 uses the data of the events accumulated in the event table 200 to set a threshold for determining the necessity of providing each guide in the guide table 300 to the event.

In the event monitoring system 23, the guide provision unit 22 executes a similarity score calculation process 13 for calculating the similarity score 14 indicating the degree of similarity between the guide message 11 of the guide table 300 and the past event message 12 which is the event message of the past event stored in the event table 200.

In this example, if there is an event message of the event for which a certain guide is to be provided among the past event message 12, it is assumed that the similarity score indicating the mutual similarity of the set of the past event message 12 and the guide message 11 of the guide indicates a value higher than the similarity score indicating the mutual similarity of the set of another event message and the guide message.

The guide provision unit 22 separates the similarities between a certain guide message 11 and each past event message 12 into a group of higher values (subset) and a group of lower values, and sets a threshold capable of separating those two groups from each other. Since the threshold is determined so that the similarity between the guide message and the event message can be separated for each guide with the use of the past event message 12, the threshold that can appropriately determine whether or not each guide can correspond to the event can be set.

In the event monitoring system 23, the guide provision unit 22 presents the result of determination by the set threshold to the manager. For example, it is sufficient to present a pair of the event and the guide in which the degree of similarity is close to the threshold. In order to separate the similarities into the group of higher values and the group of lower values, a method such as cluster analysis may be used.

The input of a feedback 15 indicating whether the presented determination result is appropriate or not, is prompted to the manager. The manager inputs to the event monitoring system 23 as the feedback 15 whether the provision to the event is appropriate or not, for each guide against the presented result.

In the guide in which the threshold for separating the similarities into the subset of the similarity of the higher values and the subset of the similarity of the lower values can be set, the threshold has already been learned, and in the guide in which such a threshold cannot be set, the threshold has not been learned. However, in this example, the determination of the manager is made. In the guide for which the presented results are determined to be correct (appropriate) by the manager, the threshold has already been learned. In the guide for which the presented results are not determined to be correct by the manager, the threshold has not been learned. If there is no event to which the guide should be provided in the past events, it is assumed that the similarities cannot be separated into the group of the higher values and the group of the lower values. In that case as well, in the guide, the threshold has not been learned. As described above, according to the present embodiment, in the guide in which the events to be provided in the past events is present, the threshold of the guide can be easily and appropriately set with the use of the past event data.

Next, in the event monitoring system. 23, the guide provision unit 22 provides the guide for new events. The event monitoring system 23 performs a similarity score calculation process 13 which is a process for calculating the similarity score of the new arrival event message 10 and each guide message 11 in the same manner as that when the threshold is set for the new arrival event message 10 as described above.

The event monitoring system 23 confirms whether or not the similarity score 14 between the guide message 11, which is the guide for which the threshold has already been learned and the new arrival event message 10 exceeds the threshold (learned threshold 17) (threshold determination process 18).

If the similarity score exceeds the threshold, the event monitoring system 23 determines that the guide including the guide message 11 should be provided to the event including the new arrival event message 10.

On the other hand, the event monitoring system 23 estimates the threshold based on the threshold of another learned guide in the guide for which the threshold has not been learned (threshold estimation process 19). If the similarity score between the guide message 11 of the guide whose threshold has been estimated and the new arrival event message 10 exceeds the estimated threshold, the event monitoring system 23 determines that the guide including the guide message 11 should be provided to the event including the new arrival event message 10.

At that time, the event monitoring system 23 estimates the threshold by learning a correspondence relationship between the guide message 11 of the guide whose threshold has already been learned and the threshold. This is to leverage a property that if the wordings of the guide messages are similar to each other, the thresholds between the guides including the guide messages are also similar to each other. With the estimation of the thresholds, the cases where the guide message of the guide whose threshold has not been learned can be unnecessarily provided to the inappropriate event can be reduced. This makes it possible to reduce the trouble of presenting an incorrect guide to the event to the monitoring operator and inputting a feedback for correcting the error.

Hereinafter, some embodiments will be described.

First Embodiment

Figure 2:
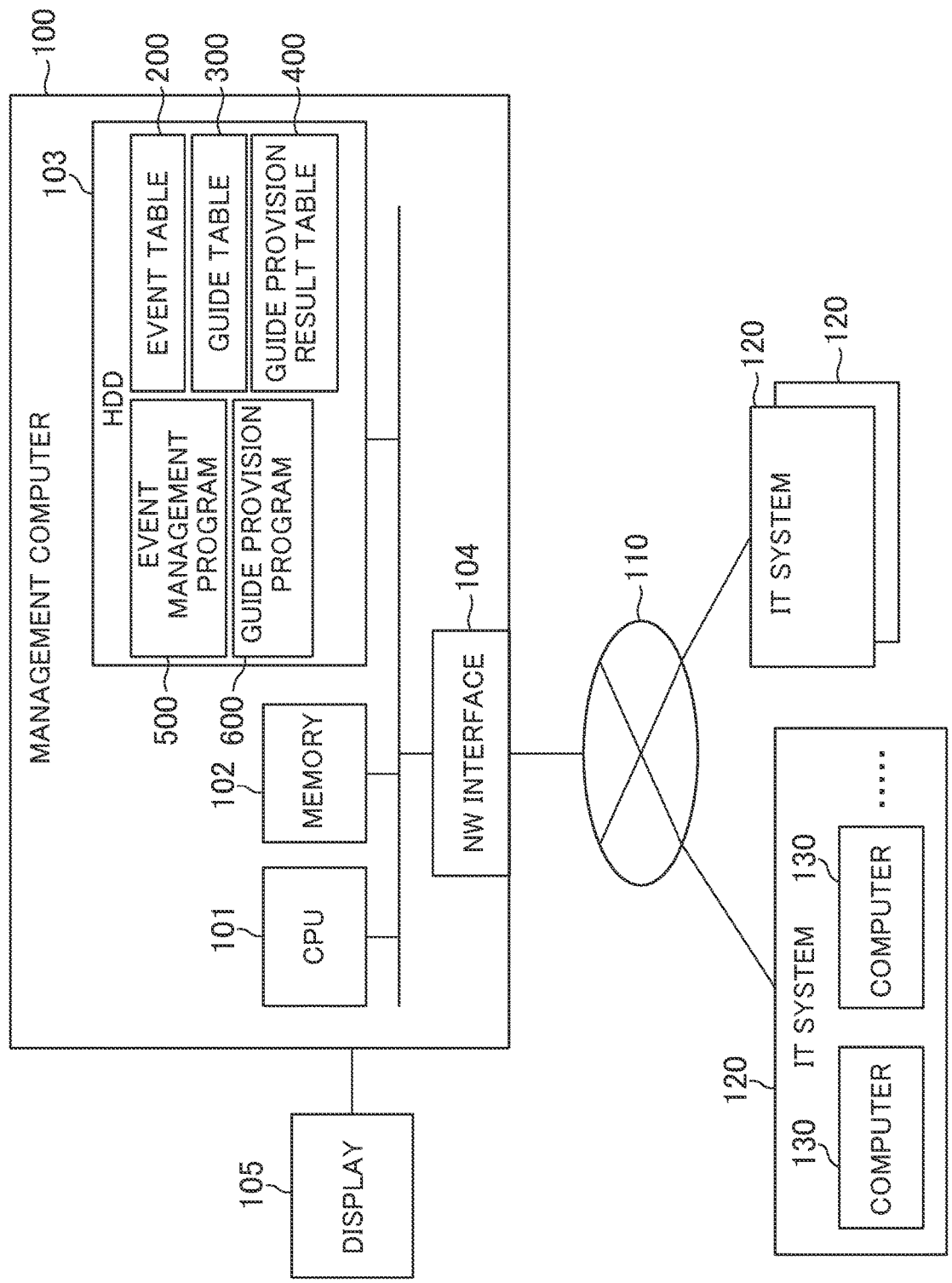
FIG. 2 is a block diagram showing a configuration of an event monitoring system according to a first embodiment.

FIG. 2 is a block diagram showing a configuration of an event monitoring system according to a first embodiment. The event monitoring system includes a management computer 100 and a display 105, and monitors events from an IT system 120. Some IT systems 120 are configured by multiple computers 130.

The management computer 100 is a computer that executes an event management program 500 and a guide provision program 600. The event management unit 21 is realized by the event management program 500, and the guide provision unit 22 described above is realized by the guide provision program 600.

The management computer 100 is connected to the IT system 120 to be monitored through a LAN (Local Area Network) 110. The management computer has a CPU 101, a memory (Hard Disk Drive) 103, and a display 105. The HDD 103 stores the event manager 500 and the guide provision program 600, the event table 200 recording the data to which those programs refer, the guide table 300, and the guide provision result table 400. The event management program 500 and the guide provision program 600 are loaded into the memory 102 and executed on the CPU 101.

An event issued by an agent (not shown) on the IT system 120 is received by the management computer 100. The monitoring operator performs an event monitoring work while looking at the display of a display 105.

The IT system 120 is configured by multiple computers 130 and a software program operating on the computers 130 as an example (not shown). The computer 130 is a computer having the same components as those of the management computer 100 as hardware. On the computer 130, an OS (not shown) and middleware (not shown), various task program (not shown), and an agent that monitors the operation of those hardware and software (not shown) are operated. When the performance or life and death of each object to be monitored satisfy a specific condition, the agent generates an event and sends the event to the management computer 100.

The event management program 500 on the management computer 100 receives the event and stores the received event in the event table 200. The guide provision program 600 reads the guide data from the guide table 300, performs a guide provision process for new arrival events in the event table 200, and stores the result in the guide provision result table 400.

An event and the result of the guide provision for the event are displayed on the display 105. The monitoring operator confirms the display of the event and the result, determines whether or not the guide provision is appropriate for the event, and if there is an error in the provision, the monitoring operator inputs the feedback of that face to the management computer 100 with the use of an input device not-shown.

FIG. 3 is a diagram showing a configuration example of the event table 200. The event table 200 is a table for storing the data possessed by each event sent from the agent. In the event table 200, a row is created for each event. On each row of the event table 200, for example, an event ID 201 for uniquely identifying each event, an event occurrence time 202, an event message 203 indicated by a character string for notifying a person of the occurrence of the event, a generation source 204 indicating the computer 130 in which the event occurs, and an agent type 205 indicating the type of the agent that has issued the event are stored. In the agent type 205, for example, the agent to monitor the OS is stored as "OS", the agent to monitor the middleware such as database is stored as "middle", and so on. In this way, information reducing the type of the agent is stored.

Also, the event table 200 may store not only the data shown in FIG. 3, but also a variety of attribute data event.

FIG. 4 is a diagram showing a configuration example of the guide table 300. The guide table 300 is a table for storing the guide data used for determining whether or not the monitoring operator should escalate the event and data such as the threshold used for automatic guide provision to the event. Escalation is that the monitoring operator informs the superior manager of the event. The monitoring operator determines the necessity of escalation according to the guide included in the event handling guide and notifies the escalation destination manager.

In the guide table 300, a row is created for each guide. On each row of the guide table 300, for example, a guide ID 301 which is an identifier that is uniquely provided to the guide, a guide message 302 which is a sample of the event message of the event corresponding to the guide, a determination rule 304 that is a rule for determining the escalation necessity of the received event, and a report destination 303 which is a department of the escalation destination are stored.

The determination rule 304, as shown in the figure, may be an IF-THEN rule to determine the escalation necessity programmatically, or a sentence in which a criterion read by a person for determination is described by a character string.

The guide table 300 stores a threshold 305, which is data used to perform automatic guide provision for the event, a threshold 305, a learning completion flag 306, a required keyword 307 and an agent type 308. The threshold 305 is a numerical value used for determining the provision of the guide. The threshold 305 is a threshold for the similarity of an event message and the guide message, and in an example of the figure, a numeral value ranging from 0.0 to 1.0 is stored. "n/a" is stored when the threshold is not learned and there is no valid numerical value in the threshold.

The learning completion flag 306 is data indicating whether or not the learning of the threshold for automatic provision of the guide for the event has been completed. In the illustrated example, "Y" is stored if learning is completed, and "N" is stored if learning is not completed.

The required keyword 307 stores a character string (plurality is available) always included in the event message for which the guide is provided.

The required keyword 307 stores the character strings of words always included in the event message of the event for which the guide should be provided. The multiple words can be set for one guide. "None" is stored in the required keyword 307 when there is no word always included in the event message of the event for which the guide should be provided.

The agent type 308 is the same information as that of the agent type 205 in event table 200 described above, and when the row of the guide is created based on the event message 203 of the generated event, the agent type 308 stores the value of the agent type 205 of the agent that has issued the original event as it is. The specific usage of data used for automatic provision of the guide for the event will be described in detail later.

FIG. 5 is a diagram showing a configuration example of the guide provision result table 400. The guide provision result table 400 is a stable for storing the result of the automatic provision for each event and the data of feedback from the monitoring operator relating to whether the result is appropriate or not.

The guide provision result table 400 stores the guide provision result for the event on each line. In each row of the guide provision result table 400, there are stored, for example, an event ID 401, a guide ID 402 of the guide provided to the event, a similarity score 403 which is a numerical value indicating the similarity between the event message 203 and the guide message 302 of the guide, a provision necessity 404 indicating whether or not the guide should be provided, a notification necessity 405 which is a determination result of the escalation necessity and a feedback 406 which stores the feedback result from the monitoring operator. The event ID401 has the same format as that the event ID201 of the event table 200. The guide ID402 is of the same type as that of the guide ID 301 of the guide table 300. The calculation method of these data stored value included in the guide provision result table 400 and the values to be stored will be described in detail later.

The multiple guide provision results may be stored for one event. For example, in FIG. 5, the guide provision result of the guide whose guide ID is "G1", and the guide provision result of the guide whose guide ID is "G3" are stored for one event whose event ID is "E1". In addition, as the guide provision result, not only when it is determined that the guide provision is necessary for the event, that is, when it is determined that the guide is appropriate to the event, but also when it is determined that the guide provision is unnecessary for the event, the guide provision result of the event and the guide may be stored. An example of FIG. 5 shows a guide provision result in which it is determined that there is no need to provide a guide whose guide ID is "G99" for the event whose event ID is "E2".

Hereinafter, a flow of some processes in the first embodiment will be described.

Figure 6:
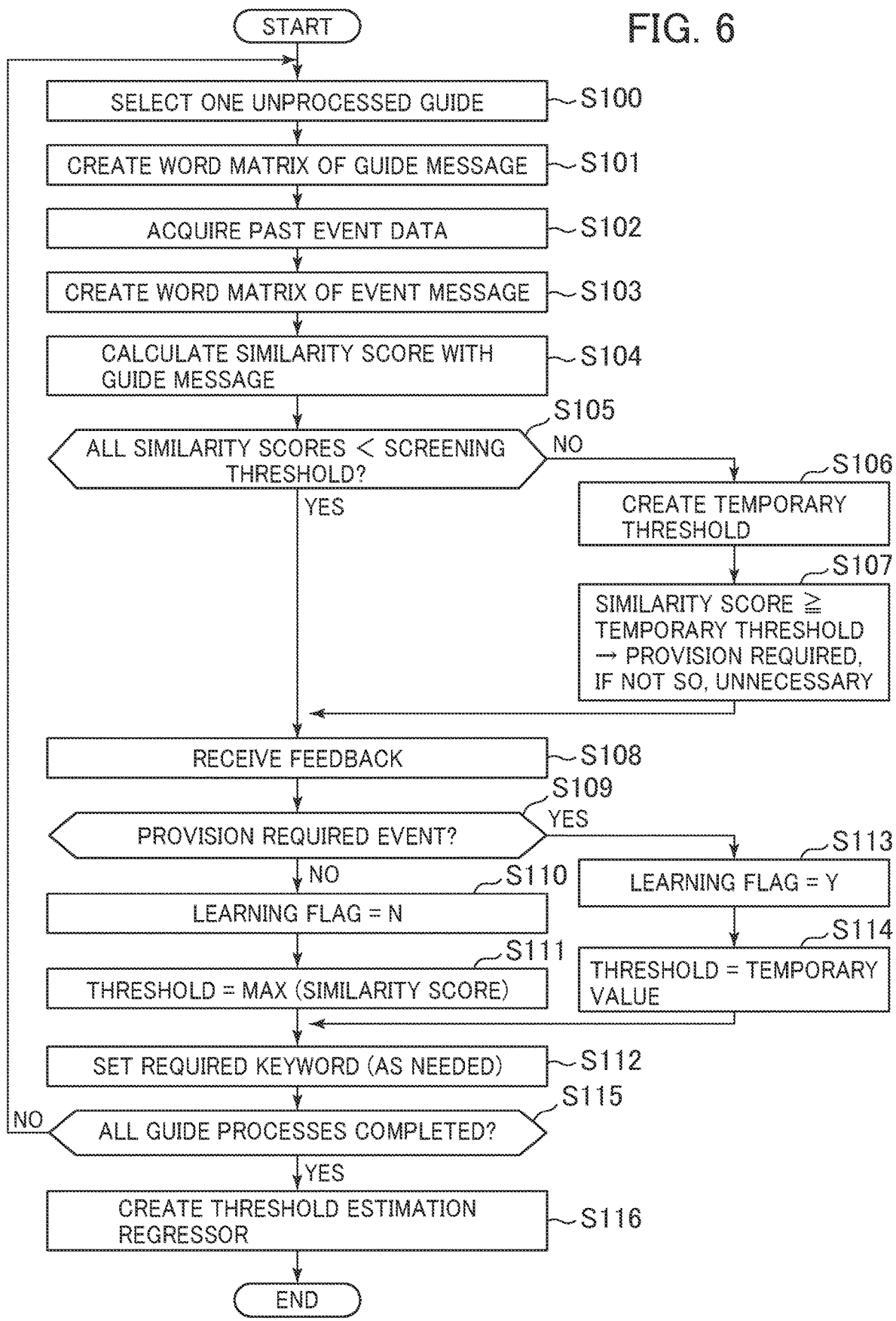
FIG. 6 is a flowchart showing an example of a threshold learning processing for automatic guide provision from past event data by a guide provision program 600.
Figure 7:
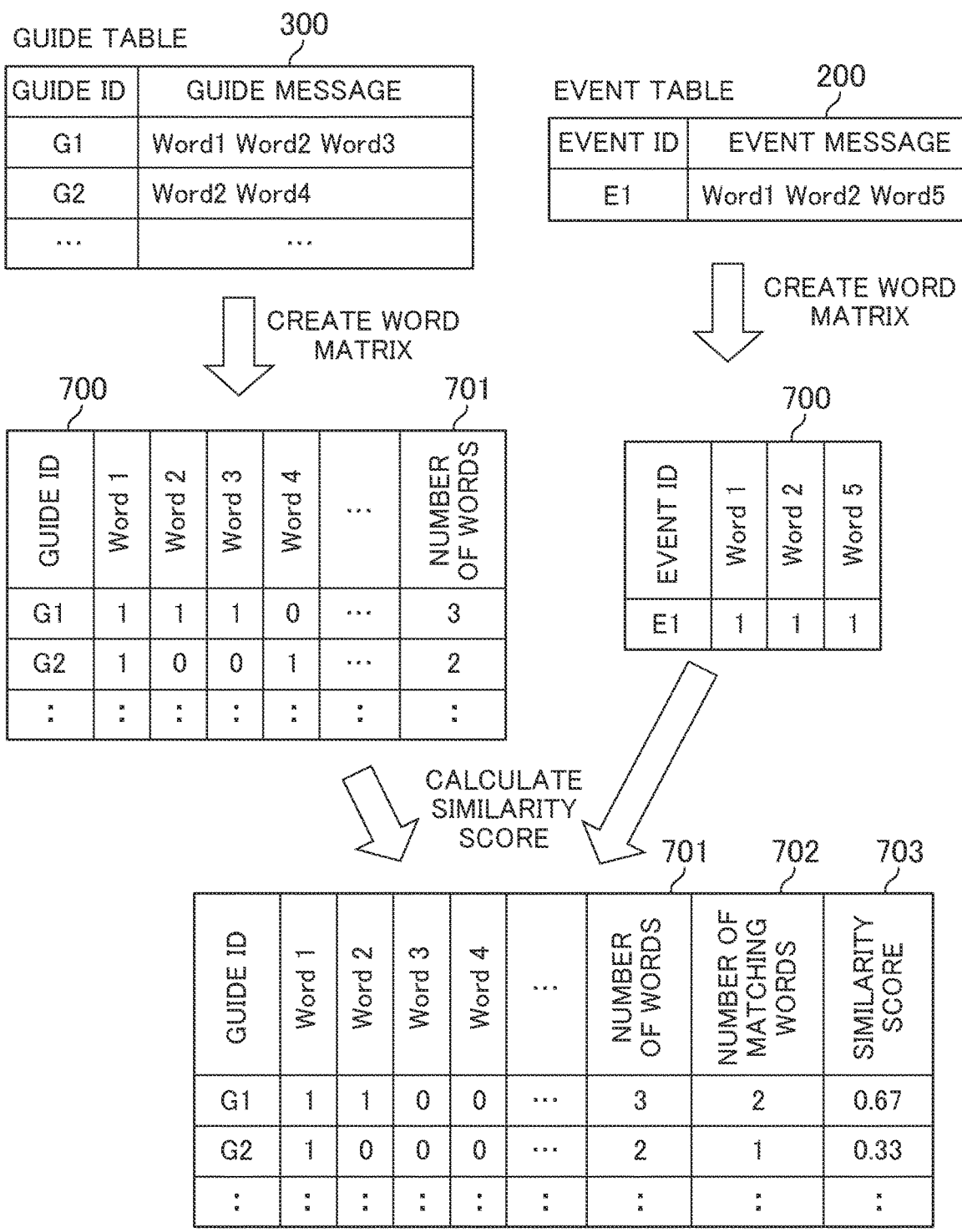
FIG. 7 is a supplementary diagram showing a process of calculating a similarity score between an event message and a guide message, which is a part of the process in FIG. 6.

First, referring to FIG. 6 and FIG. 7, a threshold learning process by the guide provision program 600 will be described. FIG. 6 is a flowchart showing an example of the threshold learning process for automatic guide provision from the past event data by the guide provision program 600. FIG. 7 is a supplementary diagram showing a process of calculating a similarity score between an event message and a guide message, which is a part of the process of FIG. 6.

First, referring to FIG. 7, an example of a method of calculating a similarity score will be described. FIG. 7 shows a flow of a process for calculating the similarity score between the event message 203 and the guide message 302.

First, the guide provision program 600 creates the word matrixes of the event message 203 and the guide message 302. The word matrix is a vector in which one or more documents are represented by words included in each document (message in this case) as elements. As a method of creating the word matrix, for example, there is a method in which multiple documents are divided into words, each document is a row and each word is a column, and when a certain document has a certain word, a cell of the matrix specified by the document and the word is set as "1, and other cells are set as "0". The word matrix may be created in other ways. For example, consecutive words may be configured as a single column (Ngram). Also, the value of the cell may be set to a value that takes into consideration the appearance frequency of the word, not 0 or 1.

In an example of FIG. 7, the guide message 302 with the guide ID of "G1" is a character string having three words "Word1, Word2, and Word3". In that case, the row of G1 in the word matrix is "1" in the columns of Word1 to Word3, and "0" in the other rows. Also, the number of words 701 in the guide message 302 is "3". However, the column with the number of words 701 is not included in the word matrix.

Similarly, the guide provision program 600 creates a word matrix from the event message 203. In the example of FIG. 5, the event message 203 is only one event message whose event ID is "E1". The event message 203 with the event ID of "E1" shown in the figure is a character string having three words "Word1, Word2, and Word5". Therefore, the word matrix to be created is only one row, and the columns of Word1, Word2 and Word 5 are "1".

Next, the guide provision program 600 compares each line of the word matrix of the guide message with the row of the word matrix of the event message, and counts common words. In an example of FIG. 7, both the column of Word1 and the column of Word2 are "1" in the row of the guide ID of "G1" and the row of the event "E1", and only one column is "1" in the example of Word3 and the example of Word5. For that reason, the number of common words (the number of matching words) is "2".

Next, the guide provision program 600 obtains a ratio of the number of matched words 702 to the number of words 701 which is the number of words included in each guide, and sets the ratio as the similarity score 703. Since the number of words of the guide whose guide ID is "G1" is "3" and the number of matching words of the guide whose guide ID is "G1" and the event whose event ID is "E 1" is "2", the similarity score 703 of the guide message whose guide ID "G1" and the event message of the event whose event ID is "E1" is 2/3=0.67.

Although an example of a method of calculating the similarity scores between the messages has been described in this case, there are other methods of calculating the similarity scores, and the calculation method is not limited to the above example. The calculation of the similarity score appears in several processes afterwards, but is assumed to be the same process.

In the present embodiment, as described above, the guide provision program 600 uses, as the degree of similarity, an index indicating the proportion of words included in the event message among the words configuring the guide message. This makes it possible to calculate the similarity between the guide message and the event message by a simple process of searching for words shared by the guide message and the event message.

FIG. 6 shows an example of a threshold learning process for automatic guide provision from the past event data in the guide provision program 600. This process is executed, for example, when a function of automatically providing the guide to the event by the management computer 100 is enabled for the first time. Alternatively, the present process may be periodically executed. For example, this process may be periodically executed whenever a process of acquiring input of feedback by the monitoring operator is not applied each time a new event as described below is received.

The present process is a process for calculating the similarity score in brute-force with an event message of an event occurred in the past in a given period (for example, three months) and a guide message of all guides included in the event handling guide, analyzing the data of the obtained similarity score for each guide, and determining a threshold for determining whether or not to provide the guide to the event.

If there is an event to which the guide should be provided among the past events, the similarity score indicating the similarity between the event message of the event and the guide message of the guide is conceivable to be higher than the similarity score of the other event of the guide. In the case of showing such a high similarity score, the threshold is automatically set so as to exceed the threshold.

In Step S100, the guide provision program 600 selects one unprocessed guide from all the rows of the guide table 300.

In Step S101, the guide provision program 600 creates a word matrix of the guide message 302 of the selected guide.

In Step S102, the guide provision program 600 acquires past event data from the event table 200. In other words, the guide provision program 600 reads the event data whose occurrence time is within a given period, in particular, the event message 203 of the event with reference to the occurrence time 202 of the event table 200. At that time, the guide provision program 600 may read not data of events within a given period but data of all accumulated events.

In Step S103, the guide provision program 600 creates a word matrix of each read event message 203.

In Step S104, the guide provision program 600 compares the word matrix of the guide message 302 created in Step S101 with the word matrix of the event message 203 created in Step S103, and calculates the similarity score indicating the similarity between the guide message 302 and the event message 203.

In Step S105, the guide provision program 600 determines whether or not there is an event that may correspond to the guide selected in Step S100. The guide provision program 600 checks whether or not there is at least one event whose similarity score is equal to or larger than a predetermined screening threshold. If the similarity score between the guide message of the selected guide and the event messages of all the read events is less than the screening threshold, the guide provision program 600 finds at least one of the similarity scores between the guide message of the selected guide and the event message of the read event, which is equal to or more than the screening threshold, the guide provision program 600 determines that there is a possibility that the event to which the guide should be provided is present, and proceeds to Step S105.

In this example, the screening threshold is a numerical value indicating a predetermined degree of the similarity score such as 0.5. When the screening threshold is 0.5, if the words common to the guide message 302 and the event message 203 are more than half the number of words of the guide message 302, the similarity score of the guide message 302 and the event message 203 exceeds the screening threshold. The above screening threshold is an example, and may be other numerical values according to the execution environment.

When it is determined that there is at least one event whose similarity score is equal to or larger than the predetermined screening threshold, the guide provision program 600 classifies all the events whose similarity score is less than the screening threshold as the selected guide not required to be provided. With the above configuration, the object to be processed in the following Step S106 and S107 can be reduced.

In Step S106, when there is a possibility that there is one or more events to which the selected guide should be provided, the guide provision program 600 creates a temporary threshold for separating the event to which the guide is provided from the other event to which the guide is not provided according to the similarity score. Various methods are conceivable as a method of preparing temporary thresholds. For example, there may be a simple method of subtracting a predetermined numerical value (a small value such as 0.05 or the like) from a maximum value of the similarity score between the guide message of the selected guide and the event message of all the events. Alternatively, when the similarity score calculated assuming that a predetermined number (for example 1 or 2) of words does not match with each other among the words included in the event message of the event having the highest similarity score with the guide message of the selected guide and matched with the words of the guide message may be set as the temporary threshold. Also, the guide provision program 600 may create a histogram of the similarity score between the guide message of the selected guide and the event messages of all the events, and set the temporary threshold so as to separate a group having the highest similarity score among the multiple groups generated in the histogram from the other groups.

In Step S107, the guide provision program 600 compares the similarity score between the guide message of the selected guide and the event message of each event with the temporary threshold, to thereby classify the events into the events (provision required) to which the selected guide should be provided and the events (provision not required) to which the selected guide does not need to be provided. If the similarity score with the guide message of the selected guide is greater than or equal to the temporary threshold set in Step S106, the guide having the guide message is classified as the provision required and the other guides are classified as then provision not required.

In Step S108, the guide provision program 600 displays on the display 105 the events to which the selected guide needs to be provided and the events to which the selected guide does not need to be provided, and accepts whether or not the classification result is appropriate as input of the feedback by the monitoring operator.

Figure 11:
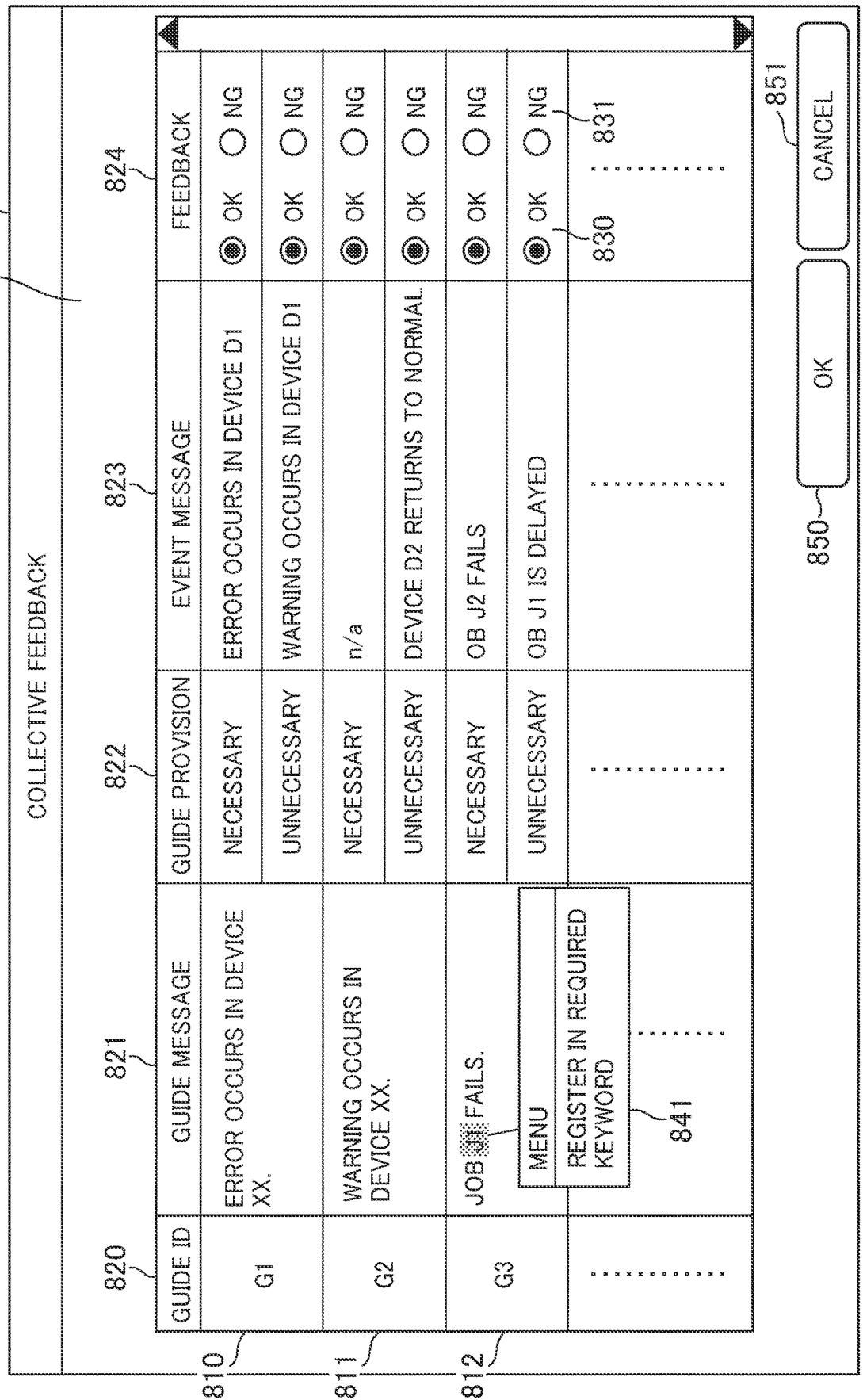
FIG. 11 is a diagram showing an example of a screen for inputting feedback.

FIG. 11 is a diagram showing an example of a screen for inputting feedback. Referring to FIG. 11, there are a table 801, an OK button 850, and a cancel button 851 in a pane of the collective feedback 800. Information on each guide is displayed in each row 810, 811, 812 of the table 801. In addition to the guide ID 820 and the guide message 821 of the guide, information on the events requiring provision and information on the events not requiring provision are displayed as information for each guide. There are guide provision 822, event message 823, and feedback 824 in each of the information on the event requiring provision and the information on the event requiring no provision.

The guide provision 822 has "necessary" and "unnecessary" for each guide. In case of "necessary", the event message of the event categorized as the guide provision required is displayed in the next event message 823 in Step S107.

In an example of FIG. 11, an event message of one event is displayed among the events classified as the guide provision required. In this example, as a method of selecting one event, a method of selecting an event having the lowest similarity score among the events classified as guide provision "required" is adopted. However, displaying one event message is only an example, and multiple event messages to be displayed may be provided. For example, the event messages of all events may be scrollably displayed.

When the guide provision 822 is "unnecessary", in the adjacent event message 823, the event message of the event having the highest similarity score among the events classified as not requiring the guide provision in Step S107 is displayed. The event message of the event having the highest similarity score among the events determined not to require the provision is displayed and the feedback is obtained, thereby being capable of knowing whether or not the event message which should essentially require the provision is determined to be unnecessary because the threshold is too high.

In the case where the guide provision 822 is "necessary" or "unnecessary", "n/a" is displayed in the event message 823 when the appropriate event does not exist. In the example of FIG. 11, "n/a" is displayed since there is no event of "need" for the guide provision 822 in a row 811.

The feedback 824 is a column to which the monitoring operator inputs whether the result of determination as to whether guide provision is necessary or not is appropriate. Either "OK" 830 or "NG" 831 can be selected for each row. If the determination result is appropriate, "OK" 830 is selected, and if the determination result is inappropriate, "NG" 831 is selected.

When "NG" 831 is selected, an event message of another event is displayed in the event message 823. For example, when "NG" 831 of the feedback 824 is selected in the row of "necessary" for the guide provision 822, an event message of an event having a lower similarity score next to the event displayed in the event message 823 until then is displayed. At this time, the temporary threshold created in Step S106 is updated to such a value that an event on which an event message has been displayed until then does not require the guide provision, and an event on which an event message is displayed next becomes a guide provision required.

Next, an operation for inputting the required keywords from that screen will be described. In the example of FIG. 11, a message text "job J1 failed" is set in the guide message 821 of a row 812. Then, a message text "Job J2 failed" is displayed in the event message 823 for which the guide provision 822 is "necessary", and a message text "Job J1 is delayed" is displayed in the event message 823 in which the guide provision 822 is "unnecessary".

In this example, it is assumed that the guide whose guide ID is G3 in this row 812 is a guide provided to the event of "J1" of the job number. Therefore, it is indispensable that "J1" of the job number match, but an event with the job number "J2" is displayed in the event message 823 for which the guide provision 822 is "necessary". This is because the similarity score shows a high value because the part other than "J1" of the job number of the event message 823 matches the message sentence of the guide message 821. However, the determination that the guide provision 822 is "necessary" is incorrect.

In such a case it is effective to set the required keywords. Therefore, in the message sentence of the guide message 821, a word to be set as the required keyword, in this example, a portion 840 of "J1" is selected by a mouse, for example, and when the mouse is right-clicked, a menu 841 is opened. When the item of registration 841 is selected as the required keyword from the menu 841, the word "J1" is registered as the required keyword, and even if the similarity score with the guide message is equal to or larger than the threshold, the guide is provided to the event having the event message not including the word "J1". In Step S112, which will be described later, the guide provision program 600 is stored in the required keyword 307 of the guide table 300.

Returning to FIG. 6, a description of the processing from Step S108 onward will be continued.

In Step S108, the guide provision program 600 accepts the information as to whether or not the provision necessity determination to the event message for each guide entered as described with reference to FIG. 11 is appropriate and the information on the required keyword (in the case of input). In this example, in the guide, an event to which the guide should be provided and an event to which the guide does not need to be provided are determined.

In Step S109, the guide provision program 600 determines whether or not one or more events to which the selected guide should be provided exist in the past events. For example, if the event message 823 whose event provision 822 is "necessary" is "n/a" as in the row 811 of FIG. 11, it is meant that there is no event to which the guide should be provided. In that case, the guide provision program 600 proceeds to Step S110. If there is more than one event to which the guide should be provided, the guide provision program 600 proceeds to Step S113.

The processing in Step S113 to S114 is a processing in a case where learning of a threshold for determining whether or not the guide is provided to the event can be performed. The processing from Step S110 to Step S111 is processing in the case where learning of the threshold cannot be performed.

Step S110 and S111 are processing for setting values of a learning completion flag 306 and the threshold 305 of the guide in the guide table 300 when the threshold could not be learned. In Step S110, the guide provision program 600 sets the value of the learning completion flag 306 of the guide to "N". In Step S111, the guide provision program 600 sets, as the threshold 305, the highest similarity score value among the similarity scores of the events classified as not requiring the guide provision.

Step S113 and S114 are processing for setting values of the learning completion flag 306 and the threshold 305 of the guide in the guide table 300 when the threshold can be learned. In Step S113, the guide provision program 600 sets the learning completion flag 306 of the guide to "Y". In Step S114, the guide provision program 600 sets the threshold 305 as the temporary threshold created in Step S106.

In Step S112, if there is the required keyword received in Step S108, the guide provision program 600 registers the received required keyword in the required keyword 307 of the guide in the guide table 300.

In Step S115, the guide provision program 600 checks whether a series of processes has been completed for all the guides, and if not completed, the process returns to Step S100. If a series of processes has been completed for all the guides, the guide provision program 600 finally sets a threshold estimation regressor 710 for estimating the threshold of the guide for which the learning of the threshold has not been completed in Step S116 and finishes the processing.

Subsequently, the threshold estimation regressor 710 will be described.

Figure 8:
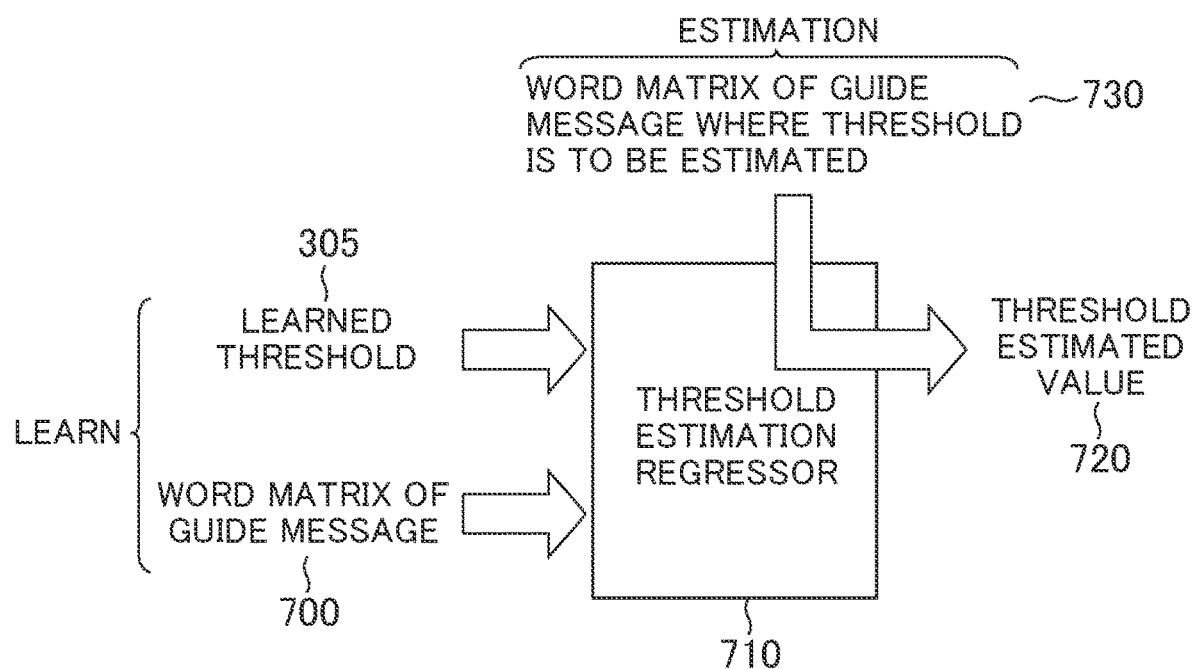
FIG. 8 is a diagram illustrating creation of a threshold estimation regressor 710 and a flow of threshold estimation.

FIG. 8 is a diagram illustrating the creation of the threshold estimation regressor 710 and a flow of threshold estimation. In this example, creation of the threshold estimation regressor 710 will be described. The threshold estimation will be described later.

The threshold estimation regressor 710 estimates the threshold of the guide for which the learning of the threshold has not been completed, that is, the guide in which the learning completion flag 306 of the guide table 300 is "N". The threshold estimation regressor 710 is created by machine learning of regression problems. An algorithm used for a regression analysis is not particularly limited. For example, the regression analysis by linear regression may be performed, the regression analysis by random forest, or the regression analysis by support vector regression, or a neural network may be performed.

Creation by learning of the threshold estimation regressor 710 is performed in the following procedure.

In the guide provision program 600, first, the learning completion flag 306 in the row of the guide table 300 is "Y", that is, the row of the guide whose learning of the threshold has been completed is taken out. Next, the guide provision program 600 creates a word matrix 700 of the guide message based on the guide message 302 of the retrieved guide. The method of creating the word matrix may be, for example, the method described above with reference to FIG. 7. Next, the guide provision program 600 creates a regressor with the use of the regression analysis algorithm described above, with the word matrix 700 of the guide message as an explanatory variable and the learned threshold 305 of the handling guide as the objective variable.

When the threshold of the guide for which the learning of the threshold has not been completed is estimated with the use of the created threshold estimation regressor 710, the word matrix 730 of the guide message whose threshold is to be estimated is created in the same manner as described above, and when the word matrix is input to the threshold estimation regressor 710, the threshold estimation value 720 is output from the threshold estimation regressor 710.

The reason why the threshold estimation method according to the present embodiment works effectively will be described.

As described above, in the case of the large-scale IT system, the number of guides included in the event handling guide becomes enormous. Many of those guides have very similar wordings of guide messages. When the wordings of the guide message are similar to each other, the thresholds for the provision determination often becomes similar to each other. The role of the threshold estimation regressor 710 is to learn a correspondence relationship between a word of a certain guide message and the definite learned threshold and to be able to estimate the threshold of another guide message similar in sentence to the guide message. This makes it possible to reduce the number of times unnecessary guides are provided for guide messages for which learning of the threshold has not been completed. As a result, the number of times that the monitoring operator inputs feedback as to whether or not the guide provision result for the new arrival event to be described later is appropriate can be reduced.

Figure 9:
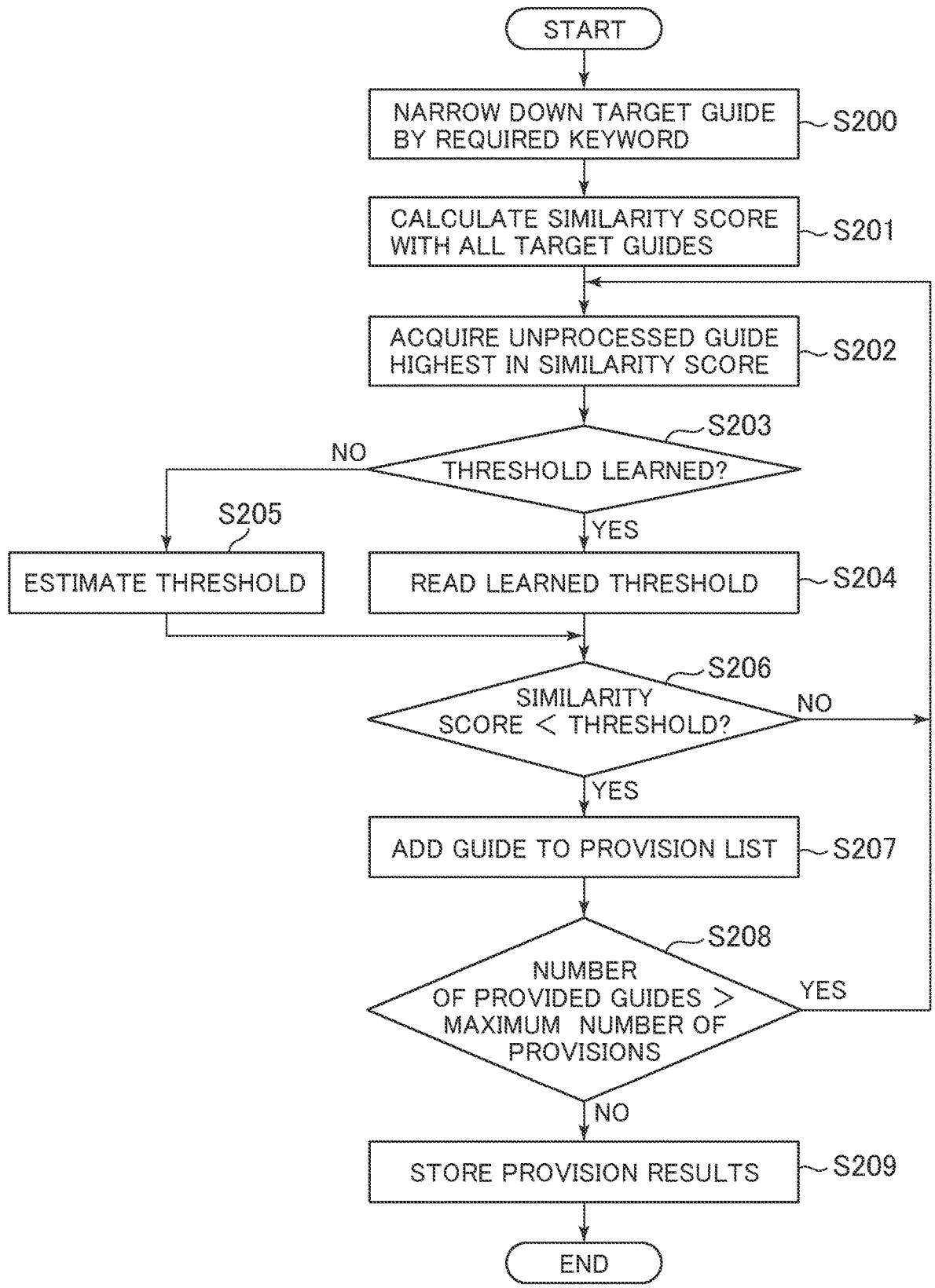
FIG. 9 is a flowchart showing an example of a flow of guide provision process for a new arrival event.

FIG. 9 is a flowchart showing an example of a flow of guide provision processing for new arrival events. This process is executed by the guide provision program 600 as a process for the event after the event management program 500 receives the new arrival event and registers the event data in the event table 200.

In Step S200, the guide provision program 600 narrows down the target guide by excluding the guide in which the required keyword 307 is not included in the event message of the new arrival event among the guides in which the required keyword 307 is set. At that time, the guide provision program 600 first reads the data of the guide table 300 and acquires the required keywords 307 of each guide. Next, the guide provision program 600 compares the event message of the newly arrived event with the acquired required keyword 307, and sets the guide including the required keyword 307 in the event message of the event as a provision candidate. Further, the guide provision program 600 also sets the guide in which the required keyword 307 is "none" as the provision candidate. In the guide provision program 600, for guides in which the multiple required keywords are stored in the required keyword 307, only guides in which all required keywords are included in the event message of the event are set as the provision candidates.

In Step S201, the guide provision program 600 calculates the similarity score between the guide message 302 of all the guides set as the provision candidates in Step S200 and the event message of the guide.

In Step S202, the guide provision program 600 selects one guide from which the processing of Step S203 to Step S208 has not yet been performed in the descending order of the calculated similarity scores.

In Step S203, the guide provision program 600 refers to the learning completion flag 306 of the guide selected in Step S202, and determines whether the learning completion flag 306 is "Y" or "N". If the value of the learning completion flag 306 is "Y", the guide provision program 600 proceeds to Step S204. If the value of the learning completion flag 306 is "N", the guide provision program 600 proceeds to Step S205.

In Step S204, the guide provision program 600 acquires the learned threshold of the guide, that is, the threshold 305.

On the other hand, in Step S205, since the learning of the threshold has not been completed in the guide provision program 600, the threshold estimation regressor 710 is used to estimate the threshold and the estimated estimation value is set as the threshold. The threshold estimating method is as described above with reference to FIG. 8. It should be noted that instead of using the estimated threshold, a value obtained by subtracting a constant value from the estimated threshold may be used. For example, when the similarity score is normalized and takes a value in a range of 0 to 1, a value obtained by subtracting 0.05 from the estimated threshold may be used. This reduces the risk that the estimated threshold is too high to miss over the guides to be provided to new arrivals events.

In Step S206, the guide provision program 600 compares the similarity score calculated in Step S201 with the threshold. If the similarity score is equal to or larger than the threshold, the guide provision program 600 determines that the guide should be provided to the event and proceeds to Step S207. Otherwise, the guide provision program 600 determines that provision is unnecessary and returns to Step S202.

In Step S207, the guide provision program 600 registers the guide in the list of guides to be provided to the event, that is, in the provision list. Multiple guides can be registered in the provision list.

In Step S208, the guide provision program 600 determines whether or not the number of guides registered in the provision list exceeds a predetermined number (for example, three). If the number of guides registered in the provision list does not exceed the predetermined number, the guide provision program 600 returns to Step S202. If the number of guides registered in the provision list exceeds the predetermined number, the guide provision program 600 proceeds to Step S209. In this process, since it is unlikely to provide too many guides for one event, an upper limit is set for the number of guides to be provided to new arrivals events. However, this process is optional and may not be carried out.

In Step S209, the guide provision program 600 stores the provision result in the provision result table 400. In the provision result table 400, the event ID 201 of the event is stored in the event ID 401 of the provision result table 400, the guide ID 402 of the guide determined to be provided is stored in the guide ID 402, and the similarity score of the guide and the event calculated in Step S201 is stored the similarity score 403. Whether or not the guide is to be provided in the provision necessity 404. If the guide is the guide registered in the provision list in Step S207, "necessary" is stored in the provision necessity 404. Further, the guide provision program 600 also stores the guide determined not to be provided to the event in the provision result table 400. At this time, instead of storing all the guides determined not to be provided to the event in the provision result table 400, for example, a higher predetermined number of guides not requiring the provision among the guides determined not to be provided are stored in the provision result table 400 in descending order of the similarity scores calculated in Step S201. For guides that do not require provision, the provision necessity 404 is set to "no".

In the notification necessity 405, information indicating whether or not to escalate to the host manager is stored only for the guide for which the provision necessity 404 is "necessary". In the notification necessity 405, "necessity" is stored if it is determined that escalation is necessary, and "unnecessity" is stored otherwise. Whether or not to escalate the event to the superior manager may be determined by the determination rule 304 of the guide determined to be provided to the event. However, if no mechanical determination rule such as "IF-THEN" is stored in the determination rule 304 and the mechanical determination cannot be made, the guide provision program 600 stores "no applicable rule" in the notification necessity 405.

In the feedback 406, the content of the feedback input by the monitoring operator with respect to the display of the guide provision result for the event is stored. Since feedback by the monitoring operator has not yet been input at the time of Step S209, "pending" which is the initial value is stored. Other values stored in the feedback 406 will be described later.

As described above, according to the present embodiment, the guide provision program 600 learns the threshold for the guide that can learn the threshold based on the multiple past events, and records the threshold in the guide table 300 in association with the guide. If the threshold of the guide has already been learned, the guide provision program 600 uses the threshold for the similarity of the new event and the guide. If the threshold has not been learned, the guide provision program 600 uses a threshold estimated based on the learned threshold of another guide for the similarity between the new event and the guide. Therefore, since the threshold is learned based on the past events and the thresholds for which learning cannot be performed are estimated from the threshold of another learned guide, an appropriate threshold for each guide can be easily set. At that time, the guide provision program 600 generates a regressor with the guide message of another guide whose threshold has already been learned as an explanatory variable, and the learned threshold of the guide as a target variable, and estimates the threshold that has not been learned with the use of the regressor. If the guide messages of the guide are similar to each other, it is considered that the thresholds of these guides tend to be close to each other. Therefore, the regressor generated with the guide message as an explanatory variable and the threshold as a target variable is used, thereby being capable of excellently estimating the threshold which has not been learned.

Figure 10:
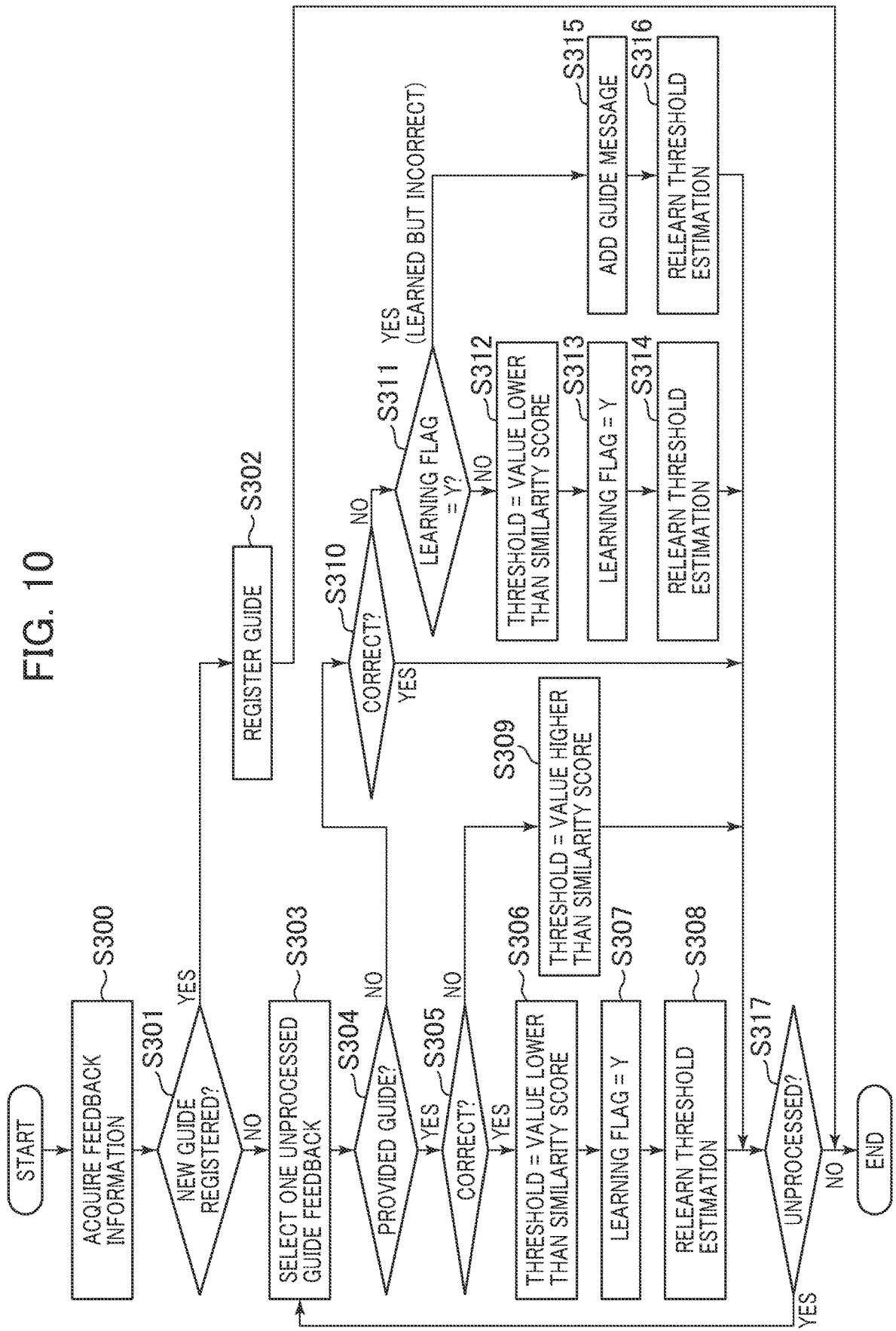
FIG. 10 is a flowchart showing an example of a process of adjusting a threshold by feedback to a guide provision result for a new arrival event.

FIG. 10 is a flowchart showing an example of a process of adjusting the threshold by feedback to the guide provision result for the new arrival event. This process is executed by the guide provision program 600. The guide provision program 600 receives the feedback input by the monitoring operator for the guide provision result for the new arrival event and adjusts the threshold based on the feedback.

In Step S300, the guide provision program 600 displays the guide provision result for the new arrival event on the display 105. The monitoring operator inputs feedback on the result. The guide provision program 600 receives the feedback.

Figure 12:
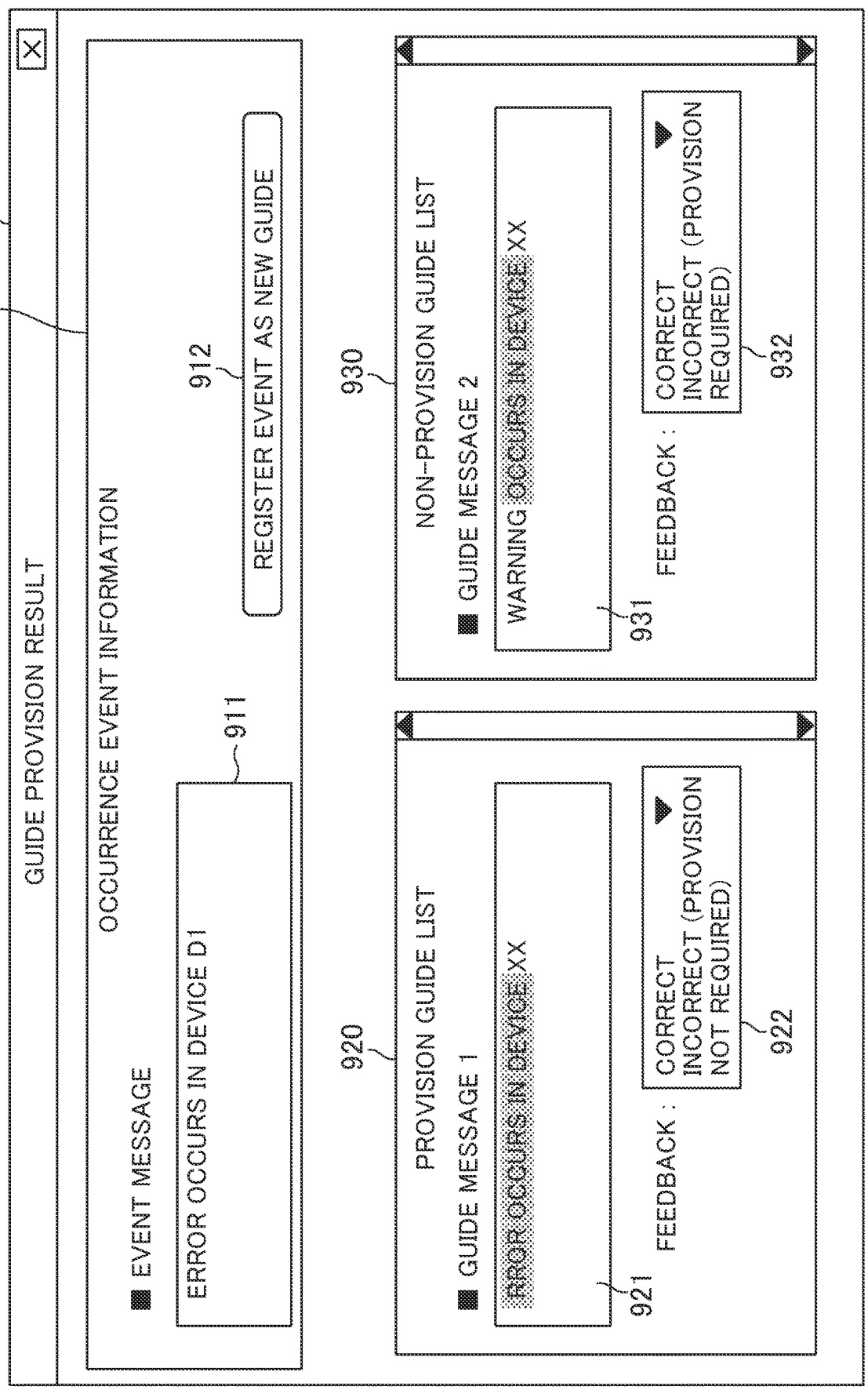
FIG. 12 is a diagram showing an example of a screen for displaying guide provision results for a new arrival event.

FIG. 12 is a diagram showing an example of a screen for displaying guide provision results for new arrival events. Referring to FIG. 12, the guide provision result screen 900 has three panes. The three panes are an occurrence event information pane 910, a provided guide list pane 920, and a guide list pane 930 not provided.

The occurrence event information pane 910 is a pane for displaying event information on new arrival events. The guide provision program 600 acquires the data of the new arrival event from the event table 200 and displays the acquired data on the screen of the occurrence event information pane 910. In an example of FIG. 12, the event message 911 of the new arrival event is displayed. Although not shown in the figure, other information such as the occurrence time 202 and the generation source 204 may be displayed.

Further, in the occurrence event information pane 910, a new guide registration button 912 is displayed. In the example of FIG. 12, "Register this event as a new guide" is displayed on the new guide registration button 912. For example, the monitoring operator refers to the provided guide list pane 920 and the guide list pane 930 that has not been provided, and when there is no guide to be provided to the new arrival event, the monitoring operator clicks the new guide registration button 912 with the mouse. Then, the monitoring operator can register a new guide based on the event message of the event. When this button is clicked, a dialog (not shown) appears to urge the monitoring operator to input the report destination 303, the determination rule 304, and the like. At the time of inputting, editing such as deleting a variable portion which does not need to match the event message at the time of creating a guide message in the event message of the event can be performed.

Registration of the new guide may be performed by the host manager instead of the monitoring operator. In that case, when the monitoring operator clicks on the new guide registration button 912 with the mouse, a notification to request registration of the new guide is transmitted to the host manager. The address information indicating the transmission destination of the notification, which is the host manager, may be set in advance.

The provided guide list pane 920 is a pane that displays information on guides (appropriate guides) provided by the guidance provision program 600 for the new arrival event and receives feedback on the information. The guide provision program 600 refers to the data on the new arrival event in the guide provision result table 400 and acquires guide data in which the provision necessity 404 is "Y". Further, the guide provision program 600 acquires the guide message 302 of the guide from the guide table 300, and displays the acquired guide message 302 on the guide message display portion 921. In the example of FIG. 12, a portion matching the event message of the new arrival event in the guide message is shaded. Although not shown, the guide provision program 600 may display other information of the guide table, such as the report destination 303, the determination rule 304, the learning completion flag 306, the similarity score 403 of the guide provision result table 400, and the notification necessity 405 on the provided guide list pane 920. The guide provision program 600 can display information on multipole appropriate guides provided to the event in this pane such that the information can be scrolled in the order of the similarity score.

The guide provision program 600 further displays a guide-specific feedback input form 922 on the provided guide list pane 920. The monitoring operator sees the guide information displayed on the provided guide list pane 920 and selects "correct answer" of the feedback input form 922 if it is correct to provide the guide to the new arrival event, but selects "error" if incorrect. The error means no provision required. It should be noted that a default of the feedback input form 922 is "correct answer", and when the monitoring operator does not perform the selection operation, "correct answer" is selected as feedback.

As described above, the guide provision program 600 determines, for each of the guides provided to the new arrival event, whether or not the provision result is "correct answer" or "error" by the monitoring operator.

The guide list pane 930 that has not been provided is a pane that displays information on the guide (inappropriate guide) that has not been provided for the new event and receives a feedback on the information. The guide provision program 600 refers to the data on the new arrival event in the guide provision result table 400 and acquires the guide data in which the provision necessity 404 is "N". The information displayed on the guide list pane 930 that has not been provided is basically the same format as the information displayed on the provided guide list pane 920. The guide provision program 600 can display information on the multiple inappropriate guides that have not been provided to the event in the guide list pane 930 that has not been provided in a scrollable manner in the order of the similarity score. The monitoring operator sees the information on the guide displayed on the guide list pane 930 that has not been provided, selects "correct answer" of the feedback input form 932 if it is correct not to provide the guide to the new arrival event, and "error" is selected if not so. The default of the feedback input form 932 is "correct answer", and when the monitoring operator does not perform selection operation, "correct answer" is selected as feedback. The guide provision program 600 acquires the feedback of whether the fact that the provision has not been made is "correct" or "error" for each guide not provided to the new arrival by the guide list pane 930 that has not been provided by the monitoring operator.

As described above, the guide provision program 600 can acquired the information for registering a guide newly input as feedback on the guide provision result screen 900, the information on whether the provision of each guide provided to the new arrival is "correct answer" or "error", and the information on whether a fact that each guide has not been provided to the new arrival event is "correct answer" or "error". The guide provision program 600 determines that the guides whose similarity between the event message of the event and the guide message exceeds the threshold as the appropriate guides, determines the guides whose similarity between the event message of the event and the guide message does not exceed the threshold as the inappropriate guides, and displays each of the appropriate guides and the inappropriate guides in order of similarity. As a result, the determination results of the appropriate guides and the appropriate guides are displayed in order of similarity for each guide, so that the determination result based on the threshold can be easily grasped, and it can be easily confirmed whether the determination is appropriate or not.

In Step S301, the guide provision program 600 determines whether or not the obtained feedback is to newly register the guide (new guide registration). If the feedback is a new guide registration, the guide provision program 600 proceeds to Step S 302, otherwise proceeds to Step S303.

In Step S302, the guide provision program 600 adds a new row to the guide table 300 and registers information on the new guide in a field of each column of the line. The guide provision program 600 may stores the event message of the new arrival event in the field of the guide message 302 as it is. However, when information on the new guide registration is input, if editing is performed such as deleting a variable part which does not need to match the event message when the message changes to the guide message from the event message, the guide provision program 600 stores the edited event message.

In Step S303, the guide provision program 600 selects one unprocessed one among the feedback to the guide provided to the event and the feedback to the guide not provided to the event.

In Step S304, the guide provision program 600 determines whether or not the feedback selected in Step S303 is feedback to the guide provided to the event. If the selected feedback is feedback to the guide provided to the event, the guide provision program 600 proceeds to Step S305. Otherwise, the guide provision program 600 determines that the selected feedback is the feedback to the guide not provided to the event, and the process goes to Step S310.

In Step S305, the guide provision program 600 determines whether or not the feedback to the guide provided to the event is that the provision is "correct answer". If the feedback indicates "correct answer", the guide provision program 600 proceeds to Step S306. If the feedback indicates "error", the guide provision program 600 proceeds to Step S309.

Steps S306 to S308 are processing in a case where the provision of the guide to the event is correct, that is, processing in a case where the threshold is a correct value, and the guide provision program 600 records the threshold, makes the threshold learned, and re-learns the threshold estimation regressor 710 based on the newly learned guide message and the data to which the threshold is added. However, if the learning completion flag 306 of the guide is already "Y", that is, if already learned, the guide provision program 600 skips the processing of Steps S306 to S308 and proceeds to Step S317. In other words, the guide provision program 600 makes it possible to input whether or not the determination on each of the appropriate guides is correct, and if an input that the determination about the appropriate guide is correct and if the guide threshold has not been learned, a threshold less than the similarity used for the determination is set in the guide, and the threshold is set as learned. As a result, the feedback on whether or not the determination result of the appropriate guide is correct can be input, and when the feedback that the determination is correct is obtained, the threshold reflecting the determination result and the feedback is set so that a reasonable threshold can be set.

Hereinafter, Steps S306, S307, and S308 will be described in detail.

In Step S306, the guide provision program 600 stores the threshold in the field of the threshold 305 of the guide table 300. As a value to be stored, a value obtained by subtracting a predetermined value from the similarity score between the new arrival event and the guide, that is, the value of the similarity score 403 stored in the provision result table 400 is used. The value to be subtracted is a margin, and the value obtained by the subtraction is a value slightly smaller than the value of the similarity score 403. However, as another example, the value of the similarity score 403 may be used as it is.

In Step S307, the guide provision program 600 stores "Y" in the learning completion flag 306 of the guide in the guide table 300.

In Step S308, the guide provision program 600 re-learns the threshold estimation regressor 710 in response to the fact that the number of learned thresholds has been incremented by one. The learning of the threshold estimation regressor 710 is described above. In other words, the guide provision program 600 generates a regressor with the guide message of the guide whose threshold has already been learned, including the guide that has already newly learned the threshold as an explanatory variable, and the learned threshold of the guide as the objective variable, and estimate a threshold which has not been learned with the use of the regressor. Therefore, since the regressor is generated with the use of the learned threshold and the newly learned threshold and used for estimating the threshold, the threshold reflecting the latest learning result can be estimated.

Step S309 is a process in the case where the provision of the appropriate guide to the new arrival event is in error. Considerably, the reason for erroneous provision is because the threshold is low. For that reason, a value obtained by adding a predetermined value to the similarity score of the new arrival event and the guide to the threshold 305 of the guide is used. The value to be added is a margin, and the value obtained by addition is a value slightly larger than the similarity score between the new arrival event and the guide.

Steps S310 to S316 are processing related to feedback on failing to provide the guides for the event. The guide provision program 600 makes it possible to input whether or not the determination on each of the inappropriate guides is correct, and if the input that the determination about the inappropriate guide is incorrect is obtained and the threshold of the guide has not been learned, a threshold less than the similarity used for determination is set in the guide, and the threshold of the guide is set as learned. Feedback as to whether the determination result of the inappropriate guide is correct or not can be input and when a feedback that the determination is erroneous is obtained, a threshold reflecting the determination result and the feedback is set, thereby being capable of setting the appropriate threshold. In addition, the guide provision program 600 registers the event message of the event as the guide message of the guide, if the input that the determination about each inappropriate guide is incorrect is obtained and the threshold of the guide has already been learned. If feedback is obtained that the determination based on the learned threshold of the inappropriate guide is in error, a new guide message is registered based on the event message of the event at that time, so that the similarity between the guide message and the event message is increased, and it can be determined as the guide to be provided when the same event occurs.

In Step S310, the guide provision program 600 determines whether or not the feedback to the guide not provided to the event is "correct answer" that the provision has not been made. If no provision is "correct answer", the guide provision program 600 does nothing and proceeds to Step S317. If no provision is "error", the guide provision program 600 proceeds to Step S311.

Steps S311 to S316 are processing in the case where feedback is obtained that the fact that the guide has not been provided to the event is in error. When the fact that the guide has not been provided to the event is in error, the guide which should be provided to the event has not been provided.

In Step S311, the guide provision program 600 determines whether or not the learning completion flag 306 of the guide, which has not been determined to be provided to the event but should be provided, is "N", that is, whether or not the threshold of the appropriate guide has not been learned. If the learning completion flag 306 of the guide is "N", the guide provision program 600 proceeds to Step S312. Otherwise, the guide provision program 600 proceeds to Step S315.

Steps S312 to S314 are processing for setting the threshold so that the guide can be correctly provided to the new arrival event and further relearning the threshold estimation regressor 710. The processing from Step S312 to Step S314 is the same as the processing from Step S306 to Step S308 described above, respectively, and therefore a description of the above processing will be omitted.

Steps S315 to S316 are processing in the case where the determination of the provision necessity is erroneous although the threshold of the guide that has not been provided but despite being learned has already been learned. The reason for this situation is that the agent issuing the event changes the text sentence of the event message described in the event, and the similarity score between the event message and the guide message decreases, resulting in a possibility that it is determined that provision is unnecessary with the existing threshold. In rare cases, text messages of the event messages are modified when agent programs are changed. As a countermeasure against the above situation, it is effective to register or additionally register a new event message of the corrected event as the guide message 302 of the guide.

In Step S315, the guide provision program 600 adds a row of the guide message 302 to the guide row of the guide table 300, and registers a text sentence of a new guide message. For the text sentence of the new guide message, the event message of the new arrival event may be used as it is. Alternatively, as in the case of the new guide registration in Step S302, a dialog may be displayed to urge the monitoring operator to input the report destination 303, the determination rule 304, or the like. At the time of inputting, editing such as deleting a variable portion which does not need to match the event message when a guide message is produced in the event message of the event can be performed. The threshold 305 of the guide table 300 stores a value of the similarity score between the guide message of the guide and the event message of the new arrival event or a value obtained by subtracting a predetermined value from the similarity score to make the value slightly smaller.

In Step S316, the guide provision program 600 re-learns the threshold estimation regressor 710. Since this processing is the same as the processing in Step S308 and Step S314, a description will be omitted in this case.

In Step S317, the guide provision program 600 determines whether or not there is an unprocessed feedback among the feedback to the guide. If there is any unprocessed feedback, the guide provision program 600 returns to Step S303, otherwise the process is completed.

Second Embodiment

Figure 13:
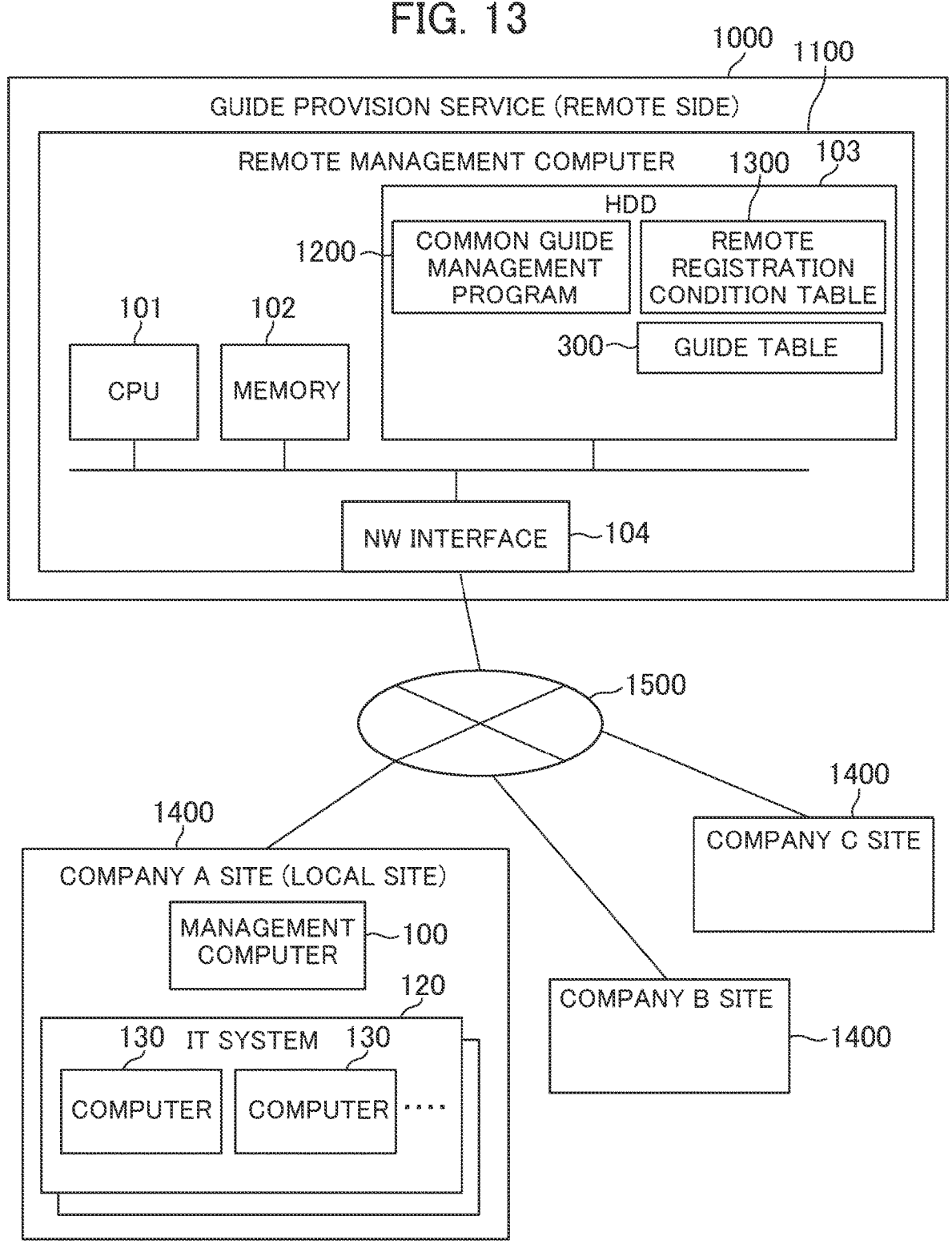
FIG. 13 is a block diagram showing a configuration of an event monitoring system according to a second embodiment.

FIG. 13 is a block diagram showing a configuration of an event monitoring system according to a second embodiment. In this example, differences of the second embodiment from the first embodiment will be mainly described.

The event monitoring system according to the second embodiment includes a guide providing service (hereinafter also referred to as a remote site) 1000 and a company site (hereinafter also referred to as a local site) 1400. The remote site 1000 and the local site 1400 are connected to each other through the Internet 1500.

In each local site 1400, a management computer 100 similar to that of the first embodiment operates together with an IT system 120.

The remote site 1000 includes a remote management computer 1100. The remote management computer 1100 is configured by a computer having the same configuration as that of the management computer 100. In an HDD 103 of the remote computer 1100, a common guide management program 1200, a remote registration condition table 1300, and a guide table 300 are stored. The guide table 300 has the same configuration as that of the management computer 100. The common guide management program 1200 is read into a memory 102 and operates on a CPU 101.

The function of the remote site 1000 collects learning results in each local site 1400, such as a guide to events issued from an agent such as an OS and middleware on an IT system 120 for each local site 1400, which can be shared by each site, a threshold for providing the guide to the event, and distributes the learning results to each local site 1400. The individual learning results at each local site 1400 are collected and commonly distributed to each local site 1400, thereby being capable of improving the guides and the thresholds efficiently more than a case where the guide is created or the threshold is determined individually by each local site 1400.

However, each local site 1400 may have guides to externally go from the local site 1400. For that reason, the remote management computer 1100 of the remote site 1000 according to the second embodiment includes a remote registration condition table 1300 describing the conditions of the guide to be registered in the remote site 1000, collects only the guides meeting the conditions described in the remote registration condition table 1300 from the local site 1400, and stores the collected guides in the guide table 300.

In the present embodiment, a configuration in which the remote management computer 1100 is provided with the remote registration condition table 1300 is illustrated, but other configurations can be performed. For example, the management computer 100 of each local site 1400 can include a remote registration condition table 1300 in which unique conditions are defined for the local site 1400. The management computer 100 of each local site 1400 may transmit only the guide that satisfies the conditions of the remote registration condition table 1300 to the remote management computer 1100 of the remote site 1000.

FIG. 14 is a diagram showing a configuration example of the remote registration condition table 1300. The remote registration condition table 1300 can set conditions in which an attribute 1301 is associated with a condition value 1302 and the attribute 1301 registers only the appropriate guide in the condition value 1302. The values stored in the column of the attribute 1301 and the column of the condition value 1302 and how to use the attribute 1301 and the condition value 1302 will be described later.

Figure 15:
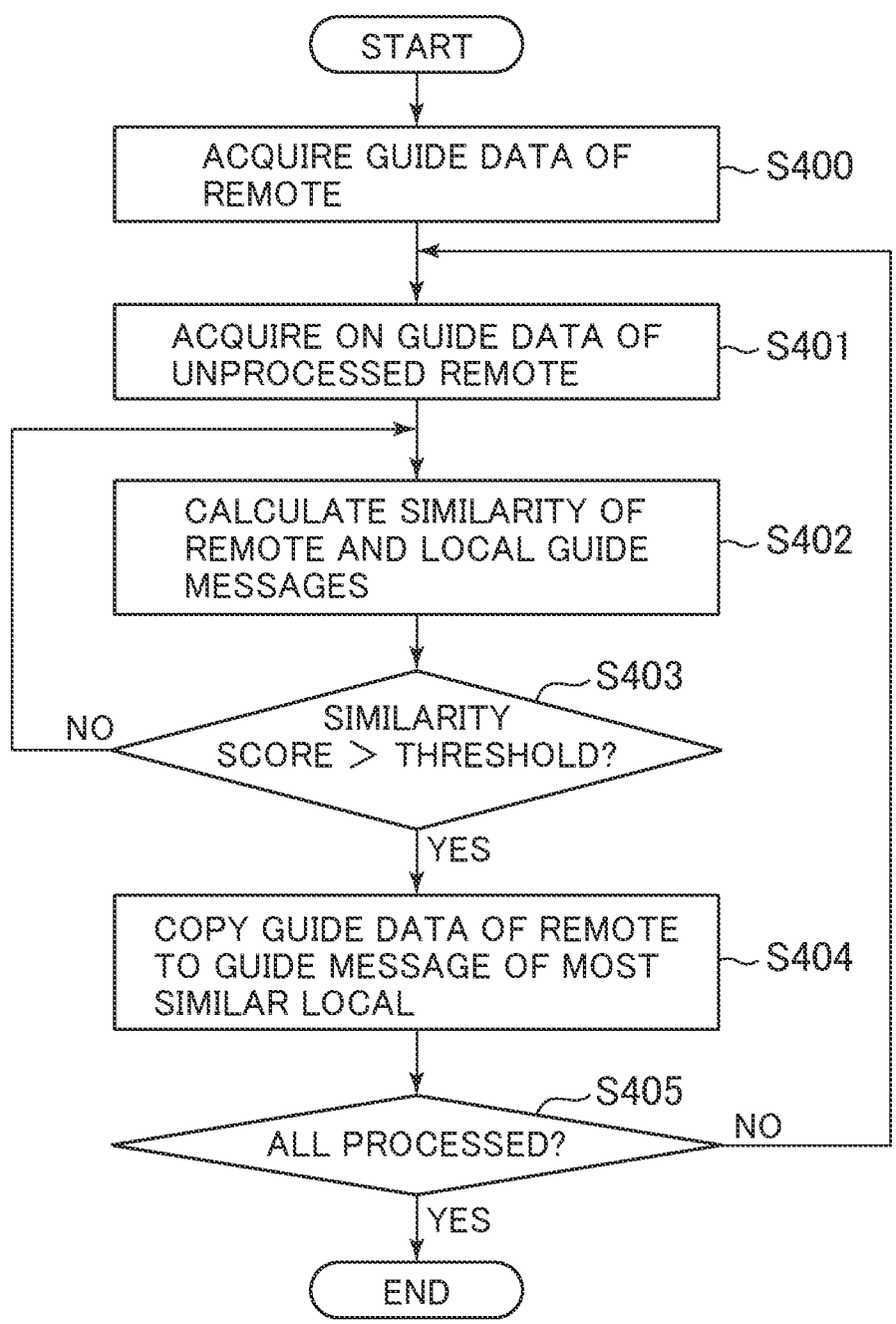
FIG. 15 is a flowchart showing an example of a flow of a process of downloading and storing data of a guide learned from a remote site at a local site.

FIG. 15 is a flowchart showing an example of a flow of a process of downloading and storing the data of the learned guide from the remote site at the local site. The management computer 100 of the local site 1400 may execute this processing when starting up for the first time. Further, the management computer 100 of the local site 1400 may periodically execute this processing. The management computer 100 of the local site 1400 may execute this processing when a new guide is added to the guide table 300 of the remote management computer 1100 of the remote site 1000.

In Step S400, the guide provision program 600 is a process of acquiring guide data of the guide table 300 in the remote management computer 1100 of the remote site 1000. The guide provision program 600 requests the remote management computer 1100 for guide data (hereinafter also referred to as a remote guide) in the guide table 300 of the remote management computer 1100. In the remote management computer 1100, the common guide management program 1200 receives the request, reads all data of the guide table 300, and sends the read data to the guide provision program 600 of the management computer 100 of the local site 1400.

In Step S401, the guide provision program 600 selects one unprocessed one from the guide data of the remote guide received in Step S400.

In Step S402, the guide provision program 600 calculates the similarity score of the guide message of the guide data selected in Step S401 and the guide message of each guide (hereinafter referred to as a "local guide") stored in the guide table 300 in the management computer 100 of the local site 1400.

In Step S403, the guide provision program 600 leaves only the local guide having the guide message whose similarity score with the guide message of the remote guide is equal to or larger than the threshold, and excludes other local guides.

In Step S404, the guide provision program 600 selects the local guide having the highest similarity score with the remote guide from among the remaining local guides. The guide provision program 600 stores the respective values of the threshold of the remote guide, the learning completion flag, and the required keyword in the fields of the local guide threshold 305, the learning completion flag 306, and the essential keyword 307 in the guide table 300. If there is no local guide whose similarity score exceeds the threshold in Step S403, the process proceeds to Step S405 without performing anything in Step S404.

In Step S405, the guide provision program 600 determines whether or not unprocessed items remain in the remote guide acquired in Step S400. If there is an unprocessed remote guide, the guide provision program 600 returns to Step S401, otherwise the present process is completed.

Through the series of processes shown in FIG. 15, the management computer 100 of the local site 1400 can capture the learned guide data at the remote site 1000, and can reduce the trouble of determining the threshold by learning at the local site 1400 and adjusting the threshold by feedback.

According to the present embodiment, an event management system includes: an event monitoring apparatus (management computer) 100 of a local site 1400 for monitoring an event including an event message indicated by a character string related to a phenomenon occurring in an information system, storing a plurality of guides including guide messages indicated by a character string and indicating a method of handling the event and a threshold relating to similarity between the guide messages of the guides and event messages in association with each other, recording the event from an IT system, and calculating the similarity between the event messages included in the event and the guide messages of the guide and associating a guide whose similarity exceeds a threshold with the event; and a common guide management device (remote management computer) 1100 of the remote side 1000, which is communicably connected to the event monitoring device and stores a common guide indicating handling the event including the guide message indicated by a character string and a common threshold which is a threshold related to the similarity of the guide message of the common guide in association with each other. The management computer 100 downloads the common guide from the remote management computer 100, calculates the similarity between the guide message of the common guide and the guide message of the plurality of guides owned by the event monitoring device, and sets the common threshold corresponding to the common guide as the threshold of the guide highest in the similarity. The common guide and the common threshold are commonly managed and the management computer 100 of the local site 1400 can set the threshold of its own guide with the use of the common threshold. Therefore, for example, the threshold of the guide that cannot be obtained by learning in the management computer 1000 of the local site 1400 can be set to an excellent value.

Figure 16:
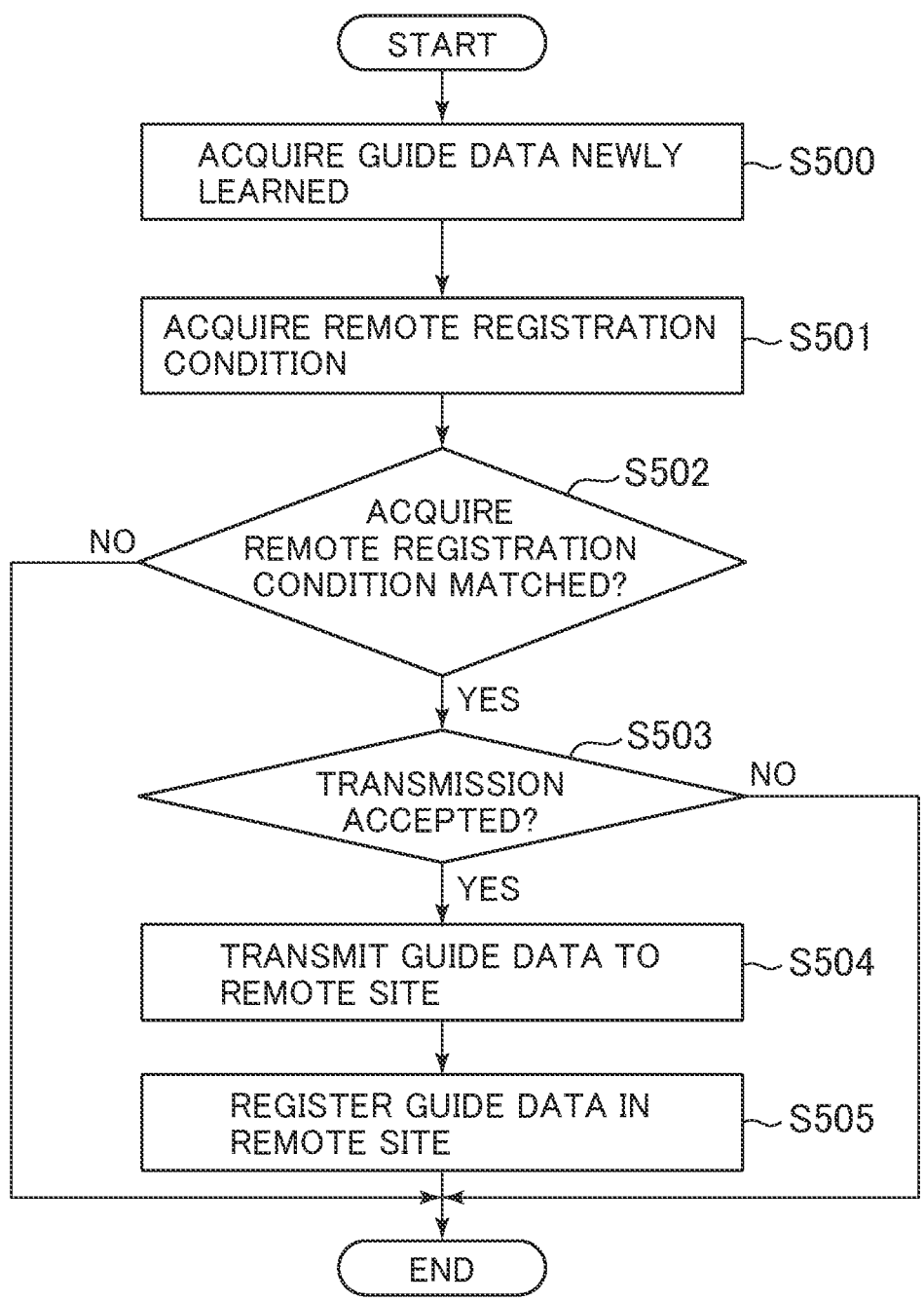
FIG. 16 is a flowchart showing an example of a process of uploading guided guide data acquired by learning at a local site to a remote site.

FIG. 16 is a flowchart showing an example of a process of uploading the guided guide data acquired by learning at the local site to the remote site. Through the present processing, the guide data generated by learning at the remote site 1400 can be collected and stored in the remote management computer 1100 of the remote site 1000. This processing may be executed when the guide provision program 600 in the management computer 100 of the local site 1400 sets the guide data to have already newly been completed.

In Step S500, the guide provision program 600 in the management computer 100 of the local site 1400 acquires from the guide table 300 the guide data for which the learning has been newly completed.

In Step S501, the guide provision program 600 requests and obtains data of the remote registration condition table 1300 from the common guide management program 1200 in the remote management computer 1100 at the remote site 1000.

In Step S502, the guide provision program 600 determines whether or not the guide that has been newly learned matches the condition described in the remote registration condition table 1300 acquired in Step S 5021. For example, in the case of the contents of the remote registration condition table 1300 illustrated in FIG. 14, if the agent type 308 of the guide is "OS" or "middle", the guide meets the condition. If the guide matches the condition of the remote registration condition table 1300, the guide provision program 600 proceeds to Step S503, otherwise the guide provision program 600 completes the present process.

In Step S503, the guide provision program 600 confirms to the manager whether or not the data of the guide may be sent to the remote site 1000. For example, a dialog requesting permission to send and register to the remote site 1000 may be displayed on the display 105, and input of approval or rejection by the manager may be obtained. If the manager accepts the sending of the guide, the guide provision program 600 proceeds to Step S504, otherwise the guide provision program 600 ends the present process.

In Step S504, the guide provision program 600 transmits the guide data of the guide to the remote site 1000.

In Step S505, in the remote management computer 1100 of the remote site 1000, the common guide management program 1200 receives the guide data and stores the guide data in the guide table 300 of the remote site 1000. At that time, the common guide management program 1200 may store the received guide data in the guide table 300 of the remote site 1000 unless the received guide data is guide data of an unregistered guide. The guide data of the registered guide can be updated to a more appropriate one. Through this processing, learned guide data with high commonality available at the multiple local sites 1400 is collected at the remote site 1000.

According to the present embodiment, the management computer 100 of the local site 1400 learns the threshold of the guide based on the past event, transmits the guide and the threshold in association with each other to the remote management computer 1100 of the remote site 1000. Since the remote management computer 1100 uses the guide received from the management computer 100 of the local site 1400 as a common guide and stores the received thresholds as a common threshold in association with each other, the threshold of the guide obtained by learning in the management computer 100 of the local site 1400 can be set as a common threshold of the common guide for commonly managing, and for example, the threshold of the guide can be provided to the local site 1400 not obtained by learning.

The embodiments and the examples of the present invention have been described. However, the present invention is not limited to only the embodiments and the examples, but the embodiments and the examples may be used in combination departing from a technical concept of the present invention, and a part of the configurations may be changed.

What is claimed is:

1. An event monitoring apparatus for monitoring an event including an event message indicated by a character string related to a phenomenon occurring in an information system, the event monitoring apparatus comprising:
   a guide storage unit that stores a plurality of guides including guide messages indicated by a character string and indicating a method of handling the event and a threshold relating to similarity between the guide messages of the guides and event messages in association with each other;
   an event storage unit that records the event from the information system; and
   a guide provision unit that calculates the similarity between the event messages included in the event and the guide messages of the guide and associates a guide whose similarity exceeds a threshold with the event.

2. The event monitoring apparatus according to claim 1, wherein the guide provision unit sets an index indicating what percentage of the words configuring the guide message is included in the event message as the similarity.

3. The event monitoring apparatus according to claim 1, wherein the guide provision unit learns the threshold for the guide that can learn a threshold based on a plurality of past events and records the threshold in the guide storage unit in association with the guide, uses the threshold for the similarity between a new event and the guide if the threshold of the guide has already been learned, and uses a threshold estimated based on the threshold of another guide which has already been learned for the similarity between the new event and the guide if the threshold has not been learned.

4. The event monitoring apparatus according to claim 3, wherein the guide provision unit calculate the similarity between the event message and the guide message of the guide for each of a plurality of past events, and sets a value separating the similarity included in a subset from the other similarity as the threshold of the guide if there is the subset including one or more similarities which is large to a degree separable from the other similarity among the calculated plurality of similarities.

5. The event monitoring apparatus according to claim 3, wherein the guide provision unit generates a regressor with a guide message of another guide whose threshold has already been learned as an explanatory variable and the learned threshold of the other guide as a target variable, and estimates a threshold which has not been learned by using the regressor.

6. The event monitoring apparatus according to claim 3, wherein the guide provision unit determines that a guide in which the similarity between the event message of the event and the guide message exceeds a threshold as an appropriate guide with respect to the event, determines that a guide in which the similarity between the event message of the event and the guide message does not exceed the threshold as the inappropriate guide, and displays the appropriate guide and the inappropriate guide in order of similarity.

7. The event monitoring apparatus according to claim 6, wherein the guide provision unit makes it possible to input whether or not the determination on each of the appropriate guides is correct, and if an input that the determination on the appropriate guide is correct is obtained and the threshold of the guide has not been learned, the guide provision unit sets the threshold less than the similarity used for the determination as the guide and sets the threshold of the guide as the learned threshold.

8. The event monitoring apparatus according to claim 6, wherein the guide provision unit makes it possible to input whether or not the determination on each of the inappropriate guides is correct, and if an input that the determination on the inappropriate guide is incorrect is obtained and the threshold of the guide has not been learned, the guide provision unit sets the threshold less than the similarity used for the determination as the guide and sets the threshold of the guide as the learned threshold.

9. The event monitoring apparatus according to claim 8, wherein the guide provision unit registers the event message of the event as the guide message of the guide if an input that the determination on each of the inappropriate guides is incorrect is obtained and the threshold of the guide has already been learned.

10. The event monitoring apparatus according to claim 7, wherein the guide provision unit generates a regressor with a guide message of a guide whose threshold has already been learned including the guide in which the threshold has newly already been learned as an explanatory variable and the learned threshold of the guide as a target variable, and estimates a threshold which has not been learned by using the regressor.

11. An event management system comprising:
    an event monitoring device for monitoring an event including an event message indicated by a character string related to a phenomenon occurring in an information system, the event monitoring apparatus storing a plurality of guides including guide messages indicated by a character string and indicating a method of handling the event and a threshold relating to similarity between the guide messages of the guides and event messages in association with each other, recording the event from the information system, and calculating the similarity between the event messages included in the event and the guide messages of the guide and associating a guide whose similarity exceeds a threshold with the event; and
    a common guide management device that is communicably connected to the event monitoring device and stores a common guide indicating handling the event including the guide message indicated by a character string and a common threshold which is a threshold related to the similarity of the guide message of the common guide in association with each other,
    wherein the event monitoring device downloads the common guide from the common guide management device, calculates the similarity between the guide message of the common guide and the guide message of the plurality of guides owned by the event monitoring device, and sets the common threshold corresponding to the common guide as the threshold of the guide highest in the similarity.

12. The event management system according to claim 11,
    wherein the event monitoring device learns the threshold of the guide based on past events, and transmits the guide and the threshold in association with each other to the common guide management device, and
    the common guide management device stores the guide received from the event management device as the common guide and the threshold as the common threshold in association with each other.

13. An event monitoring method for monitoring an event including an event message indicated by a character string related to a phenomenon occurring in an information system, causing a computer to execute:
    storing a plurality of guides indicating a method of handling the event including the guide message indicated by the character string and thresholds related to the similarity between the guide messages of the guides and the event messages in association with each other;
recording the event from the information system;
calculating the similarity between the event message included in the event and the guide message of the guide; and
associating the guide whose similarity exceeds the threshold with the event.

\* \* \* \* \*